United States Patent
Zong et al.

(10) Patent No.: US 11,528,761 B2
(45) Date of Patent: Dec. 13, 2022

(54) COMMUNICATION METHOD AND COMMUNICATIONS APPARATUS

(71) Applicant: Huawei Technologies Co., Ltd., Shenzhen (CN)

(72) Inventors: Zaifeng Zong, Nanjing (CN); Wenfu Wu, Shanghai (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 16/928,636

(22) Filed: Jul. 14, 2020

(65) Prior Publication Data

US 2020/0344827 A1 Oct. 29, 2020

Related U.S. Application Data

(63) Continuation of application No. PCT/CN2019/073412, filed on Jan. 28, 2019.

(30) Foreign Application Priority Data

Feb. 13, 2018 (CN) .......................... 201810148408.1

(51) Int. Cl.
*H04W 76/12* (2018.01)
*H04W 76/22* (2018.01)
(Continued)

(52) U.S. Cl.
CPC .............. *H04W 76/12* (2018.02); *H04W 8/02* (2013.01); *H04W 64/00* (2013.01); *H04W 76/22* (2018.02)

(58) Field of Classification Search
CPC ....... H04W 76/11; H04W 8/08; H04W 84/12; H04W 76/12; H04W 80/10; H04W 48/16;
(Continued)

(56) References Cited

U.S. PATENT DOCUMENTS 11,140,649 B2* 10/2021 Ryu ..................... H04W 60/04
2018/0227873 A1* 8/2018 Vrzic .................... H04W 76/12
(Continued)

FOREIGN PATENT DOCUMENTS

CA 3024828 A1 11/2017
CN 107580324 A 1/2018

OTHER PUBLICATIONS

Nokia, "Pseudo-CR on NF Service Discovery and Selection Requirements," 3GPP TR 29.891 v0.3.0, 3GPP TSG CT4 Meeting #79 Krakow, Poland; Aug. 21-25, 2017, C4-174329, 4 pages.
(Continued)

*Primary Examiner* — Joseph Arevalo
(74) *Attorney, Agent, or Firm* — Conley Rose, P.C.

(57) ABSTRACT

A communication method and a communications apparatus, wherein the communication method includes: receiving, by a network repository network element, a first request message from a mobility management network element, where the first request message carries a data network name of a session that a terminal device requests to establish; determining, by the network repository network element based on the first request message, at least one target session management network element from session management network elements that support the data network name; and sending, by the network repository network element, an identifier of the at least one target session management network element to the mobility management network element, such that a session management network element can be selected to provide a service for a terminal device.

26 Claims, 10 Drawing Sheets

(51) Int. Cl.
   *H04W 8/02* (2009.01)
   *H04W 64/00* (2009.01)

(58) Field of Classification Search
   CPC ..... H04W 48/18; H04W 76/25; H04W 24/02; H04W 24/04; H04W 28/0215; H04W 28/0231; H04W 28/08; H04W 28/0842; H04W 36/0011; H04W 36/0022; H04W 36/14; H04W 4/029; H04W 4/08; H04W 40/02; H04W 60/00; H04W 60/005; H04W 64/00; H04W 64/003; H04W 76/10; H04W 76/19; H04W 76/22; H04W 76/27; H04W 76/32; H04W 76/38; H04W 8/26; H04W 80/04; H04W 88/14; H04W 88/16; H04W 92/24; H04L 12/1845; H04L 12/189; H04L 12/4645; H04L 29/08; H04L 47/2416; H04L 47/263; H04L 5/0044; H04L 61/2015; H04L 61/2061; H04L 61/6022
   USPC ............ 370/329, 252, 254, 241, 352, 389
   See application file for complete search history.

(56) References Cited

U.S. PATENT DOCUMENTS

| | | | |
|---|---|---|---|
| 2019/0059067 A1* | 2/2019 | Lee | H04W 28/10 |
| 2020/0205208 A1* | 6/2020 | Hu | H04W 76/11 |
| 2021/0058748 A1* | 2/2021 | Liao | H04L 12/189 |
| 2021/0168901 A1* | 6/2021 | Kim | H04W 48/16 |
| 2022/0007150 A1* | 1/2022 | Edge | H04W 64/00 |

OTHER PUBLICATIONS

Samsung, "Baseline description for Network Function selection," SA WG2 Meeting #118bis, Jan. 16-20, 2017, Spokane, USA, S2-170258, 4 pages.
Ericsson, "ETSUN Solution," SA WG2 Meeting #125, Jan. 22-26, 2018, Gothenburg, Sweden, S2-180414, 5 pages.
CATT, "ETSUN solution for objective 1," SA WG2 Meeting #126, Feb. 26-Mar. 2, 2018, Montreal, Canada, S2-181523 ((revision of S2-18xxxx)), 4 pages.
3GPP TS 23.501 V15.0.0, "3rd Generation Partnership Project; Technical Specification Group Services and System Aspects; System Architecture for the 5G System; Stage 2 (Release 15)," Dec. 2017, 181 pages.
3GPP TS 23.502 V15.0.0, "3rd Generation Partnership Project; Technical Specification Group Services and System Aspects; Procedures for the 5G System; Stage 2 (Release 15)," Dec. 2017, 257 pages.
3GPP TS 29.510 V0.4.0, "3rd Generation Partnership Project; Technical Specification Group Core Network and Terminals; 5G System; Network Function Repository Services; Stage 3 (Release 15)," Jan. 2018, Feb. 6, 2018, 35 pages.
3GPP TS 38.413 V0.6.0, "3rd Generation Partnership Project; Technical Specification Group Radio Access Network; NG-RAN; NG Application Protocol (NGAP) (Release 15)," Jan. 2018, 94 pages.
S2-171914, Samsung, "TS 23.501: update on the SMF selection mechanism," SA WG2 Meeting #120, Mar. 27-31, 2017, Busan, South Korea, 3 pages.
S2-175605, Telecom Italia, "23.501: SMF selection in the context of Network Slicing," SA WG2 Meeting #122bis, Aug. 21-25, 2017, Sophia Antipolis, France, 4 pages.

* cited by examiner

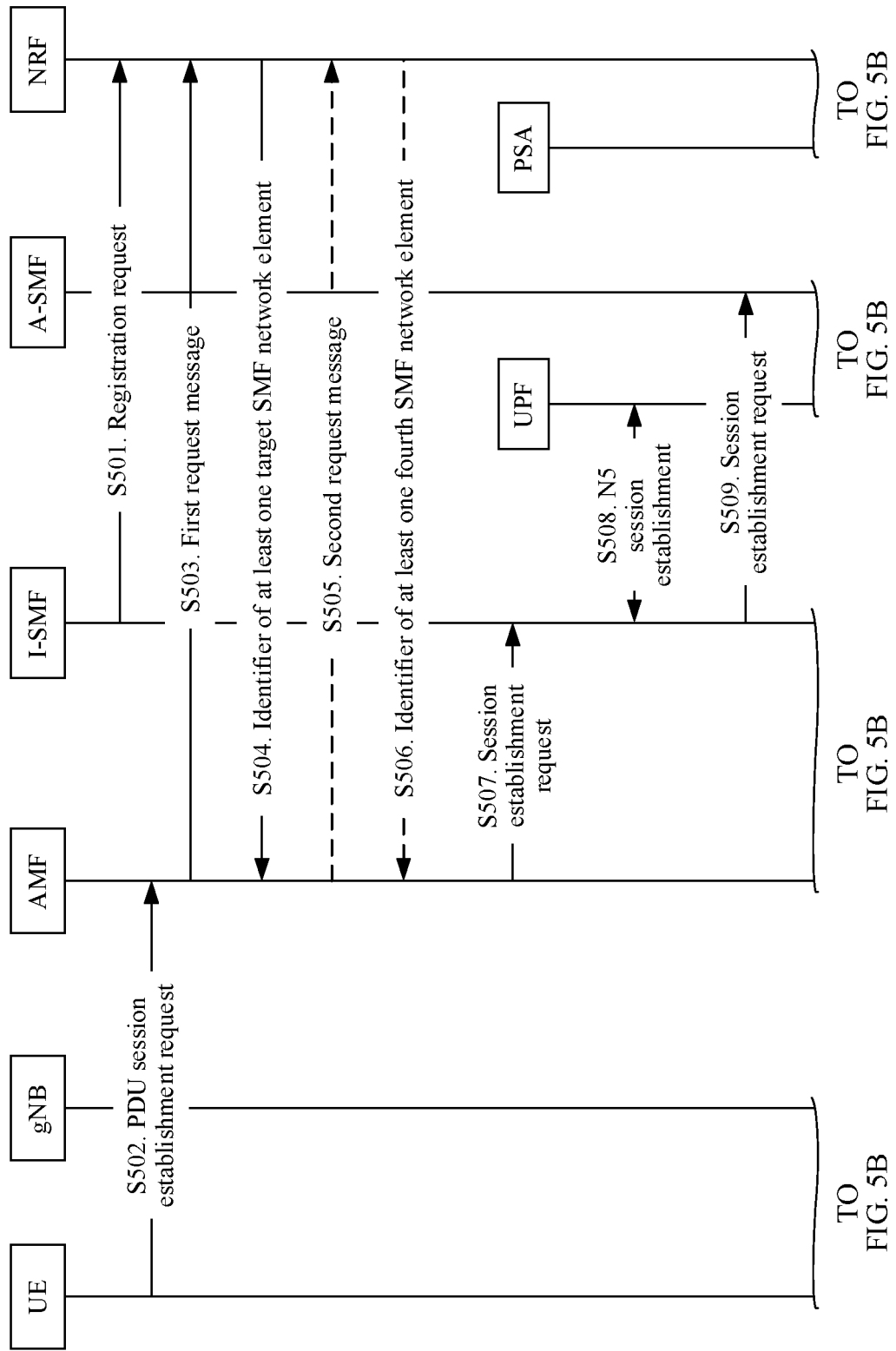

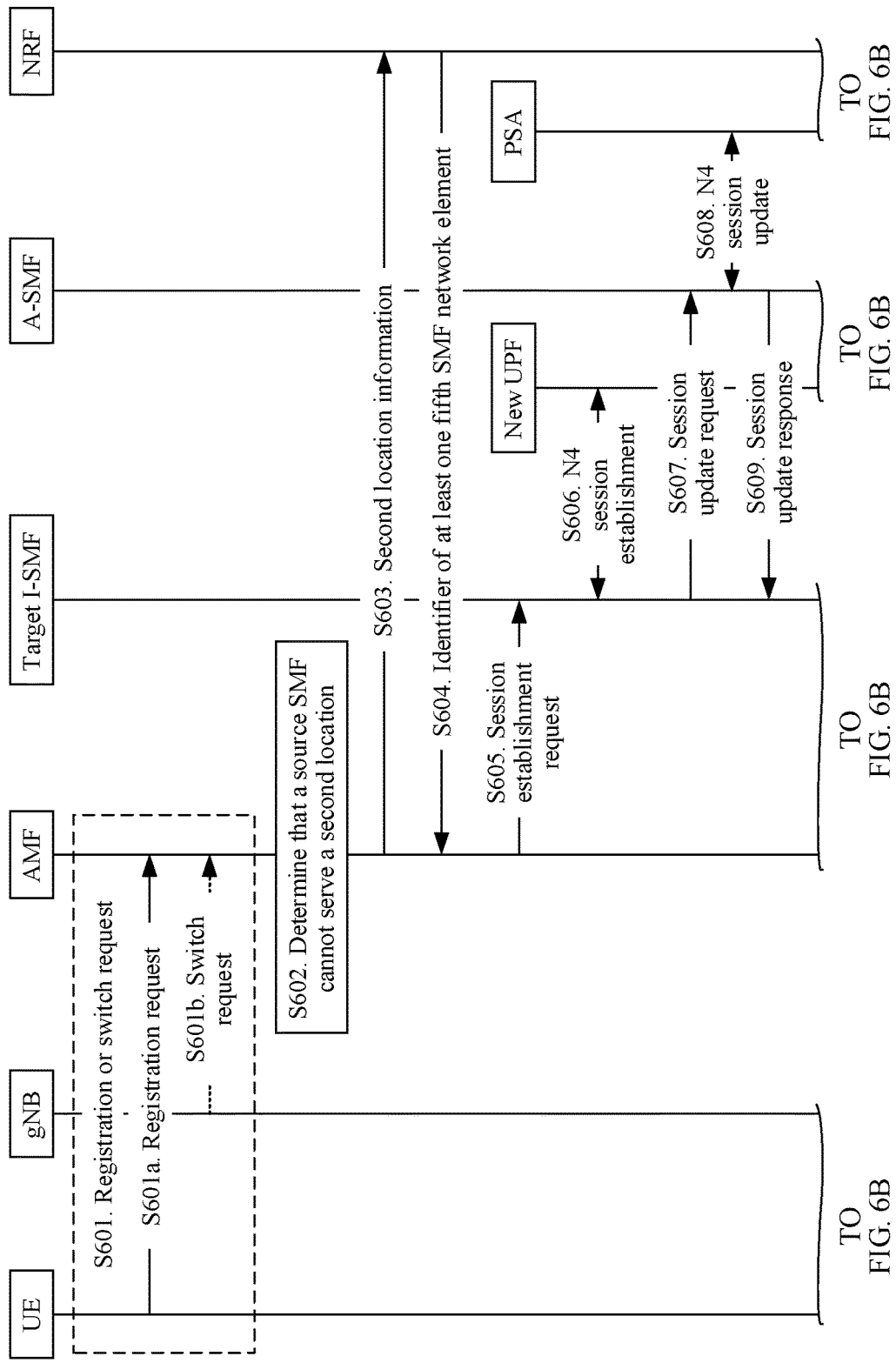

US 11,528,761 B2

COMMUNICATION METHOD AND COMMUNICATIONS APPARATUS

CROSS-REFERENCE TO RELATED APPLICATIONS

This application is a continuation of International Patent Application No. PCT/CN2019/073412, filed on Jan. 28, 2019, which claims priority to Chinese Patent Application No. 201810148408.1, filed on Feb. 13, 2018. The disclosures of the aforementioned applications are hereby incorporated by reference in their entireties.

TECHNICAL FIELD

This application relates to the communications field, and more specifically, to a communication method and a communications apparatus in the communications field.

BACKGROUND

With rapid development of wireless communications technologies, a fifth generation (5G) mobile communications technology emerges. In the 5G technology, a protocol data unit (PDU) session is managed by a session management function (SMF) network element. The SMF network element may be responsible for session management, including establishment, modification, release, and the like of the PDU session.

In actual deployment, there are a plurality of SMF network elements in a 5G network, and SMF network elements of a large operator are generally divided based on administrative regions. In this case, how to select an SMF network element to provide a service for a PDU session of a terminal device becomes an urgent problem to be resolved.

SUMMARY

This application provides a communication method and a communications apparatus, such that a session management network element can be selected to provide a service for a session of a terminal device.

According to a first aspect, a communication method is provided, including: receiving, by a network repository network element, a first request message from a mobility management network element, where the first request message carries a data network name of a session that a terminal device requests to establish; determining, by the network repository network element based on the first request message, at least one target session management network element from session management network elements that support the data network name; and sending, by the network repository network element, an identifier of the at least one target session management network element to the mobility management network element.

According to the communication method in an embodiment of this application, the network repository network element selects the at least one target session management network element for a terminal device based on the data network name of the session that the terminal device requests to establish. In this case, a session management network element can be selected to provide a service for the session of the terminal device, thereby improving system performance.

In a possible implementation, the network repository network element may be a network repository function (NRF) network element, the mobility management network element may be an access and mobility management function (AMF) network element, and the session management network element may be an SMF network element. This is not limited in this embodiment of this application.

With reference to the first aspect, in some implementations of the first aspect, the method further includes sending, by the network repository network element, information about a service area of the at least one target session management network element to the mobility management network element.

It should be understood that a service area of a session management network element is a range in which the session management network element can provide a service, and generally includes one or more tracking area identities (TAIs). The service area of the session management network element is a set of service areas of user-plane function network elements controlled by the session management network element, and a service area of the user-plane function network element is a set of TAIs supported by a base station connected to the user-plane function network element. For some special deployment scenarios, the user-plane function network element controlled by the session management network element may not be connected to any access network. In this case, the service area of the session management network element may be set to invalid, such as NULL.

With reference to the first aspect, in some implementations of the first aspect, the first request message further carries first location information, and the first location information is used to indicate a first location corresponding to an access network accessed by the terminal device. Additionally, determining, by the network repository network element based on the first request message, at least one target session management network element from session management network elements that support the data network name includes determining, by the network repository network element based on the first location information and the data network name, the at least one target session management network element from the session management network elements that support the data network name.

For example, the first request message may further carry the first location information, and the first location information indicates the first location corresponding to the access network accessed by the terminal device. The network repository network element may determine the at least one target session management network element based on the data network name carried in the first location information and the first location information. It should be understood that the first location information may carry an identifier of a base station accessed by the terminal device, an identifier of a TAI, an identifier of a cell of a base station accessed by the terminal device, and the like. This is not limited in this embodiment of this application.

In this embodiment of this application, the network repository network element selects the at least one target session management network element for the terminal device based on the data network name of the session that the terminal device requests to establish and a location corresponding to the access network accessed by the terminal device. As such, the terminal device can access, at any location, a data network that the terminal device wants to access, thereby improving system performance.

With reference to the first aspect, in some implementations of the first aspect, determining, by the network repository network element based on the first location information and the data network name, the at least one target session management network element from the session management network elements that support the data network name includes: determining, by the network repository network element based on the first location information and the data network name, whether at least one first session management network element that supports the first location and the data network name exists; and if the at least one first session management network element does not exist, selecting, by the network repository network element, at least one second session management network element that supports the data network name and at least one third session management network element that supports the first location as the at least one target session management network element. Sending, by the network repository network element, an identifier of the at least one target session management network element to the mobility management network element includes sending, by the network repository network element, an identifier of the at least one second session management network element and an identifier of the at least one third session management network element to the mobility management network element.

In this embodiment of this application, the at least one target session management network element includes the at least one second session management network element and the at least one third session management network element.

Optionally, the network repository network element may further send information about a service area of the at least one second session management network element and information about a service area of the at least one third session management network element to the mobility management network element.

Optionally, the network repository network element may further send priority information and/or load information of the at least one second session management network element and priority information and/or load information of the at least one third session management network element to the mobility management network element. As such, the mobility management network element selects, priority information and/or load information of the at least one second session management network element, one session management network element from the at least one second session management network element as an anchor session management network element and selects, based on the priority information and/or load information of the at least one third session management network element, one session management network element from the at least one third session management network element as an intermediate session management network element.

With reference to the first aspect, in some implementations of the first aspect, the method further includes sending, by the network repository network element, a type of the at least one second session management network element and a type of the at least one third session management network element to the mobility management network element. The type of the at least one second session management network element is an anchor session management network element, and the type of the at least one third session management network element is an intermediate session management network element. Further, the anchor session management network element is configured to control a session anchor user-plane function network element, and the intermediate session management network element is configured to control a user-plane function network element that interfaces with an access network.

In this embodiment of this application, if the network repository network element selects a second session management network element (an anchor session management network element) and a third session management network element (an intermediate session management network element), the network repository network element may send the type of the second session management network element and/or the type of the third session management network element to the mobility management network element. Alternatively, the network repository network element may implicitly send a type of the second session management network element and/or a type of the third session management network element. Additionally, the mobility management network element itself determines the types based on information about a service area of the second session management network element and information about a service area of the third session management network element, or based on an identifier of the second session management network element and an identifier of the third session management network element. If the network repository network element selects a group of second session management network elements (an anchor session management network element) and a group of third session management network elements (an intermediate session management network element), the network repository network element needs to send a type of the group of second session management network elements and a type of the group of session management network elements to the mobility management network element.

It should be understood that in a sending process, the network repository network element may directly send a type of a session management network element explicitly to the mobility management network element/Alternatively, the network repository network element may send implicit indication information to indicate a type of a session management network element, for example, 1 represents an intermediate session management network element, 0 represents an anchor session management network element, or 10 represents a combination of an intermediate session management network element and an anchor session management network element. This is not limited in this embodiment of this application.

It should also be understood that the network repository network element may explicitly indicate only one of the intermediate session management network element and the anchor session management network element. For example, the network repository network element only indicates that the type of the second session management network element is the anchor session management network element, and then the mobility management network element may determine, based on that the type of the second session management network element is the anchor session management network element, that the type of the third session management network element is the intermediate session management network element. This is not limited in this embodiment of this application.

With reference to the first aspect, in some implementations of the first aspect, the method further includes sending, by the network repository network element, information about a service area of the at least one second session management network element and information about a service area of the at least one third session management network element to the mobility management network element.

It should be understood that the information about the service area of the second session management network element and the information about the service area of the third session management network element may alternatively be preconfigured by the mobility management network element, or may be sent by the network repository network element to the mobility management network element. This is not limited in this embodiment of this application.

With reference to the first aspect, in some implementations of the first aspect, determining, by the network repository network element based on the first location information and the data network name, the at least one target session management network element includes: determining, by the network repository network element based on the first location information and the data network name, whether at least one first session management network element that supports the first location and the data network name exists; and if the at least one first session management network element exists, using, by the network repository network element, the at least one first session management network element as the at least one target session management network element. Sending, by the network repository network element, an identifier of the at least one target session management network element to the mobility management network element includes sending, by the network repository network element, an identifier of the at least one first session management network element to the mobility management network element.

In this embodiment of this application, the at least one target session management network element includes the at least one first session management network element.

Optionally, the network repository network element may further send information about a service area of the at least one first session management network element to the mobility management network element.

Optionally, the network repository network element may further send priority information and/or load information of the at least one first session management network element to the mobility management network element. As such, the mobility management network element selects, based on the priority information and/or load information, one session management network element from the at least one first session management network element.

With reference to the first aspect, in some implementations of the first aspect, the method further includes sending, by the network repository network element, a type of the at least one first session management network element to the mobility management network element, where the type of the at least one first session management network element is an anchor session management network element and an intermediate session management network element. Further, the anchor session management network element is configured to control a session anchor user-plane function network element, and the intermediate session management network element is configured to control a user-plane function network element that interfaces with an access network.

In this embodiment of this application, if the network repository network element selects a first session management network element (a combination of an anchor session management network element and an intermediate session management network element), the network repository network element may send a type of the first session management network element to the mobility management network element. Alternatively, the network repository network element may implicitly send the type of the first session management network element, and the mobility management network element itself determines the type. If the network repository network element selects a group of first session management network elements (a combination of an anchor session management network element and an intermediate session management network element), the network repository network element needs to send a type of the group of first session management network elements to the mobility management network element.

It should be understood that in a sending process, the network repository network element may directly send a type of a session management network element explicitly to the mobility management network element. Alternatively, the network repository network element may send implicit indication information to indicate a type of a session management network element, for example, 1 represents an intermediate session management network element, 0 represents an anchor session management network element, or 10 represents a combination of an intermediate session management network element and an anchor session management network element. This is not limited in this embodiment of this application.

With reference to the first aspect, in some implementations of the first aspect, after sending, by the network repository network element, an identifier of the at least one target session management network element to the mobility management network element, the method further includes: receiving, by the network repository network element, a second request message from the mobility management network element, where the second request message carries first location information, and where the first location information is used to indicate a first location corresponding to an access network accessed by the terminal device; determining, by the network repository network element based on the first location information, at least one fourth session management network element that supports the first location; and sending, by the network repository network element, an identifier of the at least one fourth session management network element to the mobility management network element.

Optionally, the network repository network element may further send information about a service area of the at least one fourth session management network element to the mobility management network element.

Optionally, the network repository network element may further send priority information and/or load information of the at least one fourth session management network element to the mobility management network element. As such, the mobility management network element selects, based on the priority information and/or load information, one session management network element from the at least one fourth session management network element.

With reference to the first aspect, in some implementations of the first aspect, before receiving, by a network repository network element, a first request message from a mobility management network element, the method further includes receiving, by the network repository network element, a registration request message or a configuration request message, where the registration request message or the configuration request message includes information about a service area of at least one session management network element. The information about the service area of the at least one session management network element is used to indicate a range supported by the at least one session management network element, and the at least one session management network element includes the at least one target session management network element.

For example, for all session management network elements, after a session management network element is powered on, both the session management network element and an operations and management (OAM) network element send a registration request message or configuration request message to the network repository network element, to request to perform registration or configuration for the session management network element. The registration request message may carry a data network name supported by the session management network element and information about a service area of the session management network element. Optionally, the registration request message may further carry single network slice selection assistance information (S-NSSAI) supported by the session management network element.

With reference to the first aspect, in some implementations of the first aspect, when the terminal device moves and a connection of the terminal device is switched from a source access network to a target access network, the method further includes: receiving, by the network repository network element, second location information of the terminal device from the mobility management network element, where the second location information is used to indicate a second location corresponding to the target access network accessed by the terminal device; determining, by the network repository network element based on the second location information, at least one fifth session management network element that supports the second location, where the at least one fifth session management network element can control a user-plane function network element that interfaces with the target access network; and sending, by the network repository network element, an identifier of the at least one fifth session management network element to the mobility management network element.

For example, when the terminal device moves and is switched from a source access network to a target access network, a case may occur that a session management network element (referred to as a source session management network element in this specification) that originally provides a service for the terminal device cannot continue to provide the service for the terminal device because the session management network element does not support location information of the terminal device. In this way, the mobility management network element needs to determine, based on information about a service area of the source session management network element and the second location corresponding to the target access network currently accessed by the terminal device, whether a target intermediate session management network element needs to be re-selected. When the mobility management network element determines that the target intermediate session management network element needs to be re-selected, the mobility management network element may send the second location information to the network repository network element, such that the network repository network element selects at least one fifth session management network element based on the second location information. The mobility management network element selects one session management network element from the at least one fifth session management network element as a new intermediate session management network element, to ensure that a session is not interrupted during movement of the terminal device.

According to a second aspect, a communication method is provided, including: sending, by a mobility management network element, a first request message to a network repository network element, where the first request message carries a data network name of a session that a terminal device requests to establish; and receiving, by the mobility management network element, an identifier of at least one target session management network element from the network repository network element.

With reference to the second aspect, in some implementations of the second aspect, the method further includes receiving, by the mobility management network element, information about a service area of the at least one target session management network element from the network repository network element.

With reference to the second aspect, in some implementations of the second aspect, the first request message further carries first location information, and the first location information is used to indicate a first location corresponding to an access network accessed by the terminal device. Receiving, by the mobility management network element, an identifier of at least one target session management network element from the network repository network element includes receiving, by the mobility management network element, an identifier of a second session management network element and an identifier of a third session management network element from the network repository network element.

With reference to the second aspect, in some implementations of the second aspect, the method further includes determining, by the mobility management network element, a type of the second session management network element and a type of the third session management network element based on information about a service area of the second session management network element, information about a service area of the third session management network element, and the first location information. The type is an anchor session management network element or an intermediate session management network element. Further, the anchor session management network element is configured to control a session anchor user-plane function network element, and the intermediate session management network element is configured to control a user-plane function network element that interfaces with an access network.

With reference to the second aspect, in some implementations of the second aspect, receiving, by the mobility management network element, information about a service area of the at least one target session management network element from the network repository network element includes receiving, by the mobility management network element from the network repository network element, the information about the service area of the second session management network element and the information about the service area of the third session management network element.

With reference to the second aspect, in some implementations of the second aspect, the method further includes receiving, by the mobility management network element, a type of the at least one target session management network element from the network repository network element, where the type is an anchor session management network element and/or an intermediate session management network element. The anchor session management network element is configured to control a session anchor user-plane function network element, and the intermediate session management network element is configured to control a user-plane function network element that interfaces with an access network.

With reference to the second aspect, in some implementations of the second aspect, the method further includes: determining, by the mobility management network element based on the first location information and the identifier of the at least one target session management network element or the information about the service area of the at least one target session management network element, whether the at least one target session management network element supports the first location, where the first location information is used to indicate the first location corresponding to an access network accessed by the terminal device; if the at least one target session management network element cannot support the first location, sending, by the mobility management network element, a second request message to the network repository network element, where the second request message carries the first location information; and receiving, by the mobility management network element, an identifier of at least one fourth session management network element from the network repository network element, where a type of the at least one fourth session management network element is an intermediate session management network element, and the intermediate session management network element is configured to control a user-plane function network element that interfaces with an access network.

With reference to the second aspect, in some implementations of the second aspect, when the terminal device moves and a connection of the terminal device is switched from a source access network to a target access network, the method further includes: determining, by the mobility management network element based on a second location and an identifier of a source session management network element or information about a service area of a source session management network element, whether to reselect a target intermediate session management network element for the terminal device, where the source session management network element is configured to control a user-plane function network element that interfaces with the source access network, the target intermediate session management network element is configured to control a user-plane function network element that interfaces with the target access network, and the second location is a location corresponding to the target access network accessed by the terminal device; when the mobility management network element determines that the target intermediate session management network element needs to be reselected for the terminal device, sending, by the mobility management network element, second location information to the network repository network element, where the second location information is used to indicate the second location corresponding to the target access network accessed by the terminal device; and receiving, by the mobility management network element, an identifier of at least one fifth session management network element from the network repository network element, where the identifier of the at least one fifth session management network element is determined based on the second location information.

With reference to the second aspect, in some implementations of the second aspect, determining, by the mobility management network element based on a second location and an identifier of a source session management network element or information about a service area of a source session management network element, whether to reselect a target intermediate session management network element for the terminal device includes: determining, by the mobility management network element, whether the source session management network element supports the second location; and when the source session management network element cannot support the second location, determining, by the mobility management network element, that the target intermediate session management network element is reselected for the terminal device.

According to a third aspect, a communications apparatus is provided, and the communications apparatus is configured to perform the method according to the first aspect or any possible implementation of the first aspect. For example, the apparatus includes a unit configured to perform the method according to the first aspect or any possible implementation of the first aspect.

According to a fourth aspect, a communications apparatus is provided, and the communications apparatus is configured to perform the method according to the second aspect or any possible implementation of the second aspect. For example, the apparatus includes a unit configured to perform the method according to the second aspect or any possible implementation of the second aspect.

According to a fifth aspect, another communications apparatus is provided, and the apparatus includes a transceiver, a memory, and a processor. The transceiver, the memory and the processor communicate with each other using an internal connection path, the memory is configured to store an instruction, and the processor is configured to execute the instruction stored in the memory, to control the receiver to receive a signal and control the transmitter to send a signal, such that the apparatus performs the method according to the first aspect or any possible implementation of the first aspect.

According to a sixth aspect, another communications apparatus is provided, and the apparatus includes a transceiver, a memory, and a processor. The transceiver, the memory and the processor communicate with each other using an internal connection path, the memory is configured to store an instruction, and the processor is configured to execute the instruction stored in the memory, to control the receiver to receive a signal and control the transmitter to send a signal, such that the apparatus performs the method according to the second aspect or any possible implementation of the second aspect.

In a seventh aspect, a computer program product is provided, and the computer program product includes computer program code. When the computer program code is run on a computer, the computer is enabled to perform the method according to any possible implementation of any aspect.

According to an eighth aspect, a computer-readable medium is provided, and the computer-readable medium is configured to store a computer program. The computer program includes an instruction used to execute the method according to any possible implementation of any aspect.

According to a ninth aspect, a communications chip is provided, where the communications chip stores an instruction, and when the instruction is run on a computer device, the communications chip is enabled to perform the method in any possible implementation of any one of the foregoing aspects.

BRIEF DESCRIPTION OF DRAWINGS

FIG. 5A and FIG. 5B are schematic flowcharts of another communication method according to an embodiment of this application;

FIG. 6A and FIG. 6B are schematic flowcharts of another communication method according to an embodiment of this application;

DESCRIPTION OF EMBODIMENTS

The following describes technical solutions of this application with reference to the accompanying drawings.

Figure 1:
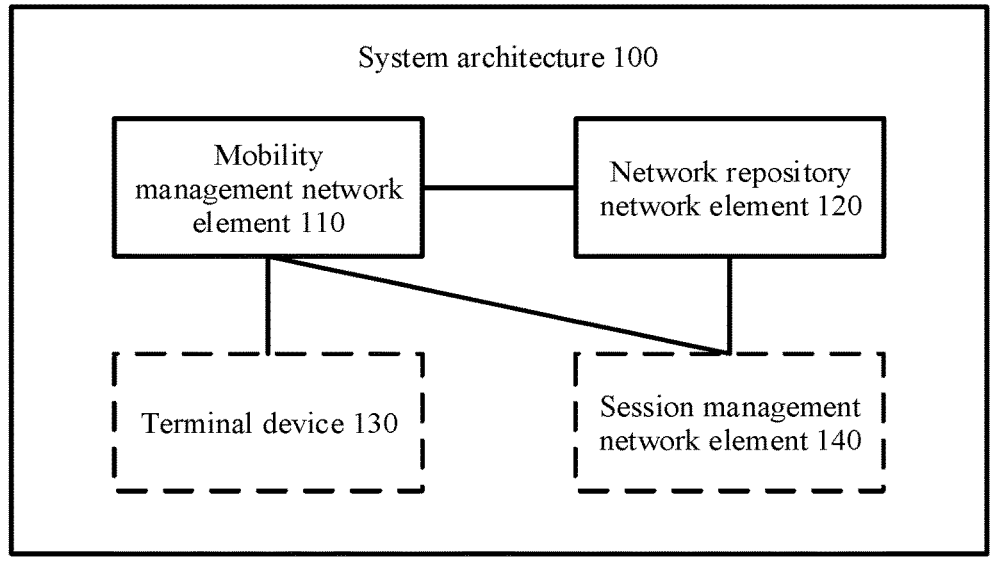
FIG. 1 is a schematic diagram of a system architecture according to an embodiment of this application.

FIG. 1 is a schematic diagram of a system architecture 100 to which an embodiment of this application is applied. As shown in FIG. 1, the system architecture 100 includes a mobility management network element 110 and a network repository network element 120. Optionally, the system architecture 100 may further include a terminal device 130 and a session management network element 140.

The system architecture 100 may be configured to perform a communication method in this embodiment of this application.

In a possible implementation, the mobility management network element 110 in the system architecture 100 is configured to: receive a first request message from a mobility management network element, where the first request message carries a data network name of a session that the terminal device requests to establish; determine, based on the first request message, at least one target session management network element from session management network elements that support the data network name; and send an identifier of the at least one target session management network element to the mobility management network element. Therefore, in the system architecture 100, the network repository network element selects the at least one target session management network element for the terminal device based on the data network name of the session that the terminal device requests to establish. In this case, a session management network element can be selected to provide a service for the session of the terminal device, thereby improving system performance.

In another possible implementation, the network repository network element 120 in the system architecture 100 is configured to: send a first request message to a network repository network element, where the first request message carries a data network name data network name of a session that the terminal device requests to establish; and receive an identifier of at least one target session management network element from the network repository network element. Therefore, in the system architecture 100, the network repository network element selects the at least one target session management network element for the terminal device based on the data network name of the session that the terminal device requests to establish. In this case, a session management network element can be selected to provide a service for the session of the terminal device, thereby improving system performance.

Optionally, the mobility management network element 110 and the network repository network element 120 in the system architecture 100 may be implemented by one device, or may be implemented by a plurality of devices together, or may be a function module in one device. This is not specifically limited in this embodiment of this application. It may be understood that the functions may be network elements in a hardware device, or may be software functions running on special-purpose hardware, or may be virtualized functions instantiated on a platform (for example, a cloud platform).

Figure 2:
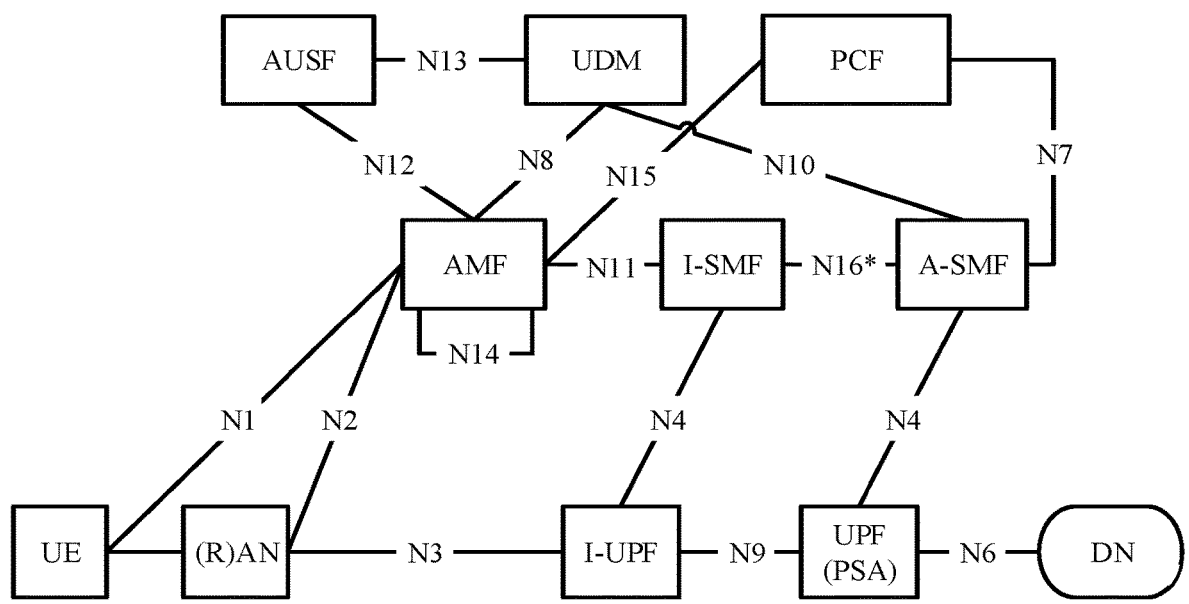
FIG. 2 is a schematic diagram of an application scenario according to an embodiment of this application.

FIG. 2 is a schematic diagram of an application scenario 200 according to an embodiment of this application. As shown in FIG. 2, the application scenario 200 may include the following network elements: an AMF network element, which is responsible for access and mobility management and has functions such as user authentication, handover, and location update; and an NRF network element, which is responsible for storing a network function and service information, supporting a service and network function discovery (that is, accepting a network function query request and providing information about a discovered network function). It should be understood that the NRF network element may interface with any other network element. This is not limited in this embodiment of this application. Therefore, the NRF network element is not shown in FIG. 2.

Optionally, the application scenario 200 may further include a session management function (SMF) network element that is responsible for session management and includes establishment, modification, release, and the like of a protocol data unit (PDU) session. The SMF network element may be divided into two types: an intermediate SMF (I-SMF) network element and an anchor SMF (A-SMF) network element. The I-SMF network element controls a user-plane function (UPF) network element (namely, an intermediate UPF (I-UPF)) that interfaces with an access network, and the A-SMF network element controls a session anchor UPF network element (namely, A-UPF).

It should be understood that in the system architecture 100, the mobility management network element 110 may correspond to the AMF network element in FIG. 2, the network repository network element 120 may correspond to the NRF network element in FIG. 2, the terminal device 130 may correspond to UE in FIG. 2, and the session management network element 140 may correspond to the SMF network element in FIG. 2.

It should be understood that, in this application, the SMF is divided into the I-SMF and the A-SMF simply because of different roles that the SMF plays in the system architecture 100 and the application scenario 200. If an SMF can control both a UPF network element that interfaces with an access network and a session anchor UPF network element, the SMF is both an I-SMF and an A-SMF, and is referred to as a combination of the I-SMF and the A-SMF in this specification. The "combination" herein means that a same device has functions of two entities. Certainly, the combined SMF network element may also use another name, and each of the I-SMF network element and the A-SMF network element may also use another name. This is not specifically limited in this embodiment of this application.

Optionally, the application scenario 200 may further include an authentication server function (AUSF) network element that has an authentication and authorization service function and is responsible for generating a key and performing two-way authentication with the UE.

Optionally, the application scenario 200 may further include a unified data management (UDM) network element that stores subscription data of a user.

Optionally, the application scenario 200 may further include a policy control function (PCF) network element that is responsible for user policy management and includes both a mobility-related policy and a PDU-session-related policy, such as a quality of service (QoS) policy or a charging policy.

Optionally, the application scenario 200 may further include a user-plane function (UPF) network element, which is responsible for forwarding user data. The UPF network element is divided into an intermediate-UPF (I-UPF) and an anchor UPF (A-UPF). The I-UPF is connected to an access network such as a radio access network (RAN). Moreover, the A-UPF is a session anchor UPF, and the A-UPF may also be referred to as a PDU session anchor UPF (PSA). This is not limited in this embodiment of this application.

Optionally, the application scenario 200 may further include a data network (DN) that is an access destination of a PDU session of a user.

It should be understood that the application scenario 200 may further include a radio access network (RAN) device and a user equipment (UE). The UE communicates with the AMF through an N1 interface, and the UE may access a 5G network using the RAN. The RAN communicates with the AMF through an N2 interface, and the RAN communicates with the I-UPF through an N3 interface. The I-UPF communicates with the I-SMF through an N4 interface, and the I-UPF communicates with the A-UPF (PSA) through an N9 interface. The A-UPF (PSA) communicates with the A-SMF through an N4 interface, and the A-UPF (PSA) communicates with the DN through an N6 interface. The AMF communicates with the I-SMF through an N11 interface, the AMF communicates with the AUSF through an N12 interface, the AMF communicates with the UDN through an N8 interface, and the AMF communicates with the PCF through an N15 interface. The I-SMF communicates with the A-SMF through an N16* interface, the A-SMF communicates with the UDM through an N10 interface, and the A-SMF communicates with the PCF through an N7 interface.

It should be noted that, an example in which only the terminal device is used as the UE is used for description in FIG. 2. The interface name between the network elements in FIG. 2 is merely an example. In implementation, the interface name of the system architecture 100 may alternatively be another name. This is not specifically limited in this embodiment of this application. In addition, the RAN device may also be referred to as an access device, and the access device refers to a device that accesses a core network.

A radio access network device is an access device used by the terminal device to access the mobile communications system in a wireless manner. The radio access network device may be a base station (such as a NodeB), an evolved NodeB (eNodeB), a gNodeB (gNB) in a 5G mobile communications system, a base station in a future mobile communications system or an access node in a WiFi system, or may be a radio controller in a cloud radio access network (CRAN) scenario. Alternatively, the access network device may be a relay station, an access point, a vehicle-mounted device, a wearable device, a network device in a future 5G network, a network device in a future evolved public land mobile network (PLMN) network, or the like. A specific technology and a specific device form that are used by the radio access network device in this embodiment of this application are not limited.

Certainly, another network element, such as a network slice selection function (NSSF) network element may also be deployed in the application scenario 200. This is not specifically limited in this embodiment of this application.

Optionally, the application scenario 200 shown in FIG. 2 may be applied to the 5G network and another future possible network. This is not specifically limited in this embodiment of this application.

The terminal device (terminal) in this embodiment of this application may include various devices having a wireless communication function, such as a handheld devices, a vehicle-mounted device, a wearable device, a computing device, or another processing device connected to a wireless modem. Additionally, or alternatively, the terminal device may include a subscriber unit, a cellular phone, a smart phone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a relay user equipment, or the like. The relay user equipment may be, for example, a 5G home gateway (RG). For convenience of description, the devices mentioned above in this application are collectively referred to as the terminal device.

It should be understood that the terminal device can provide single network slice selection assistance information (S-NSSAI) and a data network name (DNN) for the AMF network element when initiating PDU session establishment. The AMF network element determines an address of a session management network element based on the S-NSSAI, the DNN, and other information (such as subscription information of the terminal device and a local operator policy). The determined session management network element may establish a PDU session for the terminal device based on the S-NSSAI and the DNN.

Figure 3:
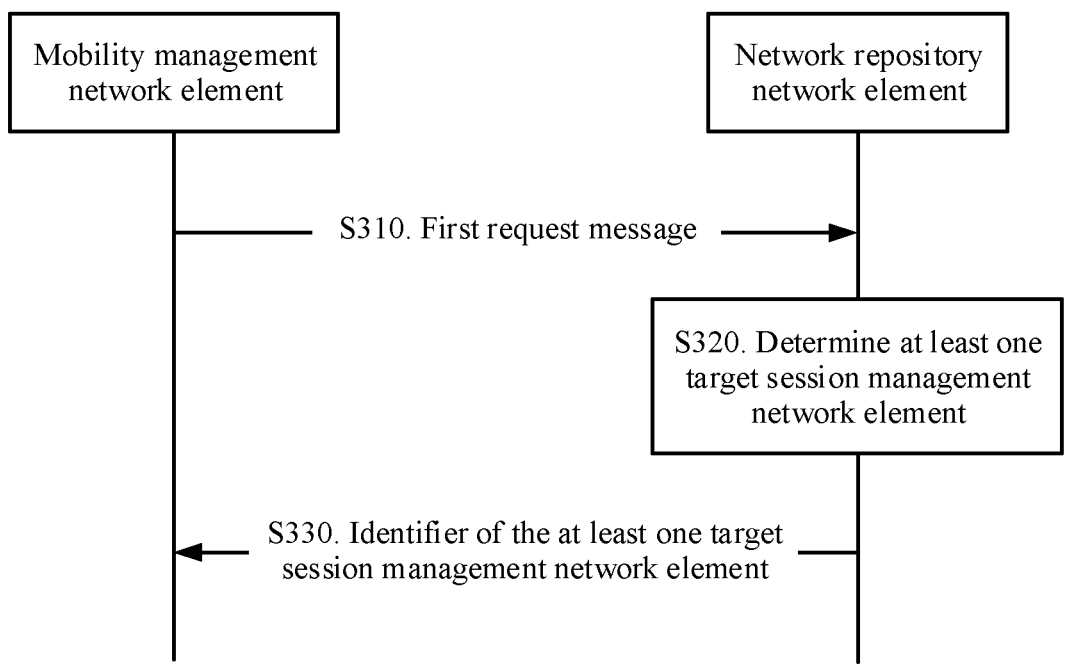
FIG. 3 is a schematic flowchart of a communication method according to an embodiment of this application.

FIG. 3 is a schematic flowchart of a communication method 300 according to an embodiment of this application. The method 300 may be applied to the system architecture 100 shown in FIG. 1, or may be applied to the application scenario 200 shown in FIG. 2. This embodiment of this application is not limited thereto.

S310. A mobility management network element sends a first request message to a network repository network element, where the first request message carries a data network name data network name of a session that a terminal device requests to establish.

Correspondingly, the network repository network element receives the first request message sent by the mobility management network element.

S320. The network repository network element determines, based on the first request message, at least one target session management network element from session management network elements that support the data network name.

S330. The network repository network element sends an identifier of the at least one target session management network element to the mobility management network element. Correspondingly, the mobility management network element receives the identifier of the at least one target session management network element sent by the network repository network element based on the first request message.

For example, the mobility management network element may send the first request message to the network repository network element, to request the network repository network element to select a session management network element for the terminal device. The first request message may carry the data network name of the session that the terminal device requests to establish. The network repository network element determines the at least one target session management network element from session management network elements that support the data network name, and sends the identifier of the at least one target session management network element to the mobility management network element.

According to the communication method in this embodiment of this application, the network repository network element selects the at least one target session management network element for the terminal device based on the data network name of the session that the terminal device requests to establish. In this case, a session management network element can be selected to provide a service for the session of the terminal device, thereby improving system performance.

In a possible implementation, the network repository network element may be an NRF network element, and the mobility management network element may be an AMF network element. This is not limited in this embodiment of this application. Optionally, the session may be a packet data unit (PDU) session, and the data network name may be a DNN.

In an optional embodiment, the method further includes: sending, by the network repository network element, information about a service area of the at least one target session management network element to the mobility management network element; and correspondingly, receiving, by the mobility management network element, the information about the service area of the at least one target session management network element sent by the network repository network element.

For example, the network repository network element may further send the information about the service area of the at least one target session management network element to the mobility management network element, such that the mobility management network element determines, based on the information about the service area of the at least one target session management network element, a range in which the at least one target session management network element can provide a service.

It should be understood that a service area of a session management network element is a range in which the session management network element can provide a service, and generally includes one or more tracking area identities (TAT). The service area of the session management network element is a set of service areas of user-plane function network elements (for example, a UPF network element) controlled by the session management network element, and the service area of the user-plane function network element is a set of TAIs supported by a base station connected to the user-plane function network element. For some special deployment scenarios, the user-plane function network element controlled by the session management network element may not be connected to any access network. In this case, the service area of the session management network element may be set to invalid, for example, NULL.

In an optional embodiment, the first request message further carries first location information, and the first location information is used to indicate a first location corresponding to an access network accessed by the terminal device.

The determining, by the network repository network element based on the first request message, at least one target session management network element from session management network elements that support the data network name includes determining, by the network repository network element based on the first location information and the data network name, the at least one target session management network element from the session management network elements that support the data network name.

For example, the first request message may further carry the first location information, to indicate the first location corresponding to the access network accessed by the terminal device. The network repository network element may determine the at least one target session management network element based on the data network name and the first location information that are carried in the first request message.

It should be understood that the first location information may carry an identifier of a base station accessed by the terminal device, an identifier of a TAI, an identifier of a cell of a base station accessed by the terminal device, and the like. This is not limited in this embodiment of this application.

In an existing 5G architecture, when the terminal device is in a non-roaming state, all user-plane function network elements in a session-user-plane path of the terminal device are controlled by one session management network element. A session of the terminal device may correspond to a plurality of user-plane function network elements, and locations of these user-plane function network elements may be remote from each other. For example, one of the plurality of user-plane function network elements is located at a location near an access point of the terminal device, and may interface with a base station accessed by the terminal device, while another user-plane function network element is located at another location. In this case, the session management network element that provides a service for the session of the terminal device needs to be able to control the user-plane function network elements at different locations. In actual deployment, session management network elements and user-plane function network elements of a large operator are generally divided based on administrative regions. A session management network element that manages a user-plane function network element in a region can manage only the user-plane function network element in this region, and cannot manage a user-plane function network element in another region.

Therefore, because a user-plane function network element that accesses a data network is deployed only in a specific region, when the terminal device wants to access the data network from another region, a session management network element that controls the user-plane function network element that accesses the data network cannot control a user-plane function network element corresponding to a current access network of the terminal device. Consequently, the terminal device cannot establish a session to the data network.

In this embodiment of this application, the network repository network element selects the at least one target session management network element for the terminal device based on the data network name of the session that the terminal device requests to establish and a location corresponding to the access network accessed by the terminal device. As such, the terminal device can access, at any location, a data network that the terminal device wants to access. This improves system performance.

It should be understood that the at least one target session management network element may be a combination of an anchor session management network element (for example, an A-SMF) and an intermediate session management network element (for example, an I-SMF) that supports both the data network name and the first location, or may be an intermediate session management network element that supports only the first location, or may be an anchor session management network element that supports only the data network name. This is not limited in this embodiment of this application. The network repository network element may select the at least one target session management network element in different manners. A first selection manner is that the network repository network element selects a combination of an intermediate session management network element and an anchor session management network element, or selects one intermediate session management network element and one anchor session management network element. A second selection manner is that the network repository network element selects a combination of a group of intermediate session management network elements and a group of anchor session management network elements, or selects a group of intermediate session management network elements and a group of anchor session management network elements. A specific selection manner may be agreed upon by a protocol, or may be configured by the mobility management network element for the network repository network element using signaling. This is not limited in this embodiment of this application.

In an optional embodiment, determining, by the network repository network element based on the first location information and the data network name, the at least one target session management network element from the session management network elements that support the data network name includes: determining, by the network repository network element based on the first location information and the data network name, whether at least one first session management network element that supports the first location and the data network name exists; and if the at least one first session management network element does not exist, selecting, by the network repository network element, at least one second session management network element that supports the data network name and at least one third session management network element that supports the first location, as the at least one target session management network element.

The sending, by the network repository network element, an identifier of the at least one target session management network element to the mobility management network element includes: sending, by the network repository network element, an identifier of the at least one second session management network element and an identifier of the at least one third session management network element to the mobility management network element.

Correspondingly, the mobility management network element receives the identifier of the second session management network element and the identifier of the third session management network element that are sent by the network repository network element.

In this embodiment of this application, the at least one target session management network element includes the at least one second session management network element and the at least one third session management network element.

For example, after receiving the first request message, the network repository network element may determine, based on the first location information and the data network name that are carried in the first request message, whether the at least one first session management network element that supports the first location and the data network name exists. Optionally, if the at least one first session management network element exists, the at least one first session management network element is the combination of the intermediate session management network element and the anchor session management network element. If the at least one first session management network element does not exist, the network repository network element may separately select the at least one second session management network element that supports the data network name and the at least one third session management network element that supports the first location. Additionally, the network repository network element may send the identifier of the at least one second session management network element and the identifier of the at least one third session management network element to the mobility management network element.

Optionally, the network repository network element may further send information about a service area of the at least one second session management network element and information about a service area of the at least one third session management network element to the mobility management network element.

Optionally, the network repository network element may further send priority information and/or load information of the at least one second session management network element and priority information and/or load information of the at least one third session management network element to the mobility management network element, such that the mobility management network element selects, based on the priority information and/or load information of the at least one second session management network element, one session management network element from the at least one second session management network element as the anchor session management network element and selects, based on the priority information and/or load information of the at least one third session management network element, one session management network element from the at least one third session management network element as the intermediate session management network element.

In an optional embodiment, the method further includes: sending, by the network repository network element, a type of the at least one second session management network element and a type of the at least one third session management network element to the mobility management network element; and correspondingly, receiving, by the mobility management network element, the type of the at least one second session management network element and the type of the at least one third session management network element that are sent by the network repository network element.

The type of the at least one second session management network element is an anchor session management network element, and the type of the at least one third session management network element is an intermediate session management network element. The anchor session management network element is configured to control a session anchor user-plane function network element, and the intermediate session management network element is configured to control a user-plane function network element that interfaces with an access network.

In this embodiment of this application, if the network repository network element uses the first selection manner, that is, the network repository network element selects a second session management network element (an anchor session management network element) and a third session management network element (an intermediate session management network element), the network repository network element may send a type of the second session management network element and/or a type of the third session management network element to the mobility management network element. Alternatively, the network repository network element may implicitly send a type of the second session management network element and/or a type of the third session management network element. Additionally, the mobility management network element itself determines the types based on information about a service area of the second session management network element and information about a service area of the third session management network element, or based on an identifier of the second session management network element and an identifier of the third session management network element. If the network repository network element uses the second selection manner, that is, the network repository network element selects a group of second session management network elements (anchor session management network elements) and a group of third session management network elements (intermediate session management network elements), the network repository network element needs to send a type of the group of second session management network elements and a type of the group of session management network elements to the mobility management network element.

For example, the mobility management network element may determine the type of the second session management network element and the type of the third session management network element in the following two manners.

Manner 1: The mobility management network element may determine, based on the information about the service area of the second session management network element and the information about the service area of the third session management network element, a session management network element of which the information about the service area includes the first location as the intermediate session management network element, and a session management network element of which the information about the service area does not include the first location as the anchor session management network element.

Manner 2: The mobility management network element may determine, based on the identifier of the second session management network element and the identifier of the third session management network element, the type of the second session management network element and the type of the third session management network element from service area indication information in the identifier. For example, the mobility management network element determines a session management network element of which a session management network element service area indicated by the service area indication information includes the first location as the intermediate session management network element, and determines a session management network element of which a session management network element service area indicated by the service area indication information does not include the first location as the anchor session management network element.

It should be understood that in the second manner, the identifier of the session management network element carries the service area indication information, for example, the identifier of the session management network element is a fully qualified domain name (FQDN). For a specific session management network element, if an identifier of the session management network element is a session management network element, nanjing.jiangsu.china.cmcc, corresponding service area indication information is nanjing.jiangsu.china, and the service area indication information indicates a session management network element that may serve Nanjing in Jiangsu province.

It should also be understood that in a sending process, the network repository network element may directly send a type of a session management network element explicitly to the mobility management network element. Alternatively, the network repository network element may send implicit indication information to indicate a type of a session management network element, for example, 1 represents an intermediate session management network element, 0 represents an anchor session management network element, or 10 represents a combination of an intermediate session management network element and an anchor session management network element. This is not limited in this embodiment of this application.

It should also be understood that the network repository network element may explicitly indicate only one of the intermediate session management network element and the anchor session management network element. For example, the network repository network element indicates only that the type of the second session management network element is the anchor session management network element. In this case, the mobility management network element may determine, based on that the type of the second session management network element is the anchor session management network element, that the type of the third session management network element is the intermediate session management network element. This is not limited in this embodiment of this application.

In an optional embodiment, sending, by the network repository network element, information about a service area of the at least one target session management network element to the mobility management network element includes sending, by the network repository network element, the information about the service area of the second session management network element and the information about the service area of the third session management network element to the mobility management network element.

Correspondingly, receiving, by the mobility management network element, the information about the service area of the at least one target session management network element from the network repository network element includes receiving, by the mobility management network element, the information about the service area of the second session management network element and the information about the service area of the third session management network element that are sent by the network repository network element.

It should be understood that the information about the service area of the second session management network element and the information about the service area of the third session management network element may alternatively be preconfigured by the mobility management network element, or may be sent by the network repository network element to the mobility management network element. This is not limited in this embodiment of this application.

In an optional embodiment, determining, by the network repository network element based on the first location information and the data network name, the at least one target session management network element includes: determining, by the network repository network element based on the first location information and the data network name, whether at least one first session management network element that supports the first location and the data network name exists; and if the at least one first session management network element exists, using, by the network repository network element, the at least one first session management network element as the at least one target session management network element.

The sending, by the network repository network element, an identifier of the at least one target session management network element to the mobility management network element includes sending, by the network repository network element, an identifier of the at least one first session management network element to the mobility management network element.

Correspondingly, the mobility management network element receives the identifier of the at least one first session management network element sent by the network repository network element.

In this embodiment of this application, the at least one target session management network element includes the at least one first session management network element.

For example, after receiving the first request message, the network repository network element may determine, based on the first location information and the data network name that are carried in the first request message, whether the at least one first session management network element that supports the first location and the data network name exists. The at least one first session management network element is the combination of the intermediate session management network element and the anchor session management network element. If the at least one first session management network element exists, the network repository network element may directly determine the at least one first session management network element as the target session management network element, and send the identifier of the at least one first session management network element to the mobility management network element.

Optionally, the network repository network element may further send information about a service area of the at least one first session management network element to the mobility management network element.

Optionally, the network repository network element may further send priority information and/or load information of the at least one first session management network element to the mobility management network element. As such, the mobility management network element selects, based on the priority information and/or load information, one session management network element from the at least one first session management network element.

In an optional embodiment, the method further includes: sending, by the network repository network element, a type of the at least one first session management network element to the mobility management network element; and correspondingly, receiving, by the mobility management network element, the type of the at least one first session management network element sent by the network repository network element.

The type of the at least one first session management network element is an anchor session management network element and an intermediate session management network element. The anchor session management network element is configured to control a session anchor user-plane function UPF network element, and the intermediate session management network element is configured to control a UPF network element that interfaces with an access network.

In this embodiment of this application, if the network repository network element uses the first selection manner, that is, the network repository network element selects one first session management network element (a combination of an anchor session management network element and an intermediate session management network element), the network repository network element may send a type of the first session management network element to the mobility management network element, or may implicitly send a type of the first session management network element, and the mobility management network element itself determines the type. If the network repository network element uses the second selection manner, that is, the network repository network element selects a group of first session management network elements (a combination of an anchor session management network element and an intermediate session management network element), the network repository network element needs to send a type of the group of first session management network elements to the mobility management network element.

It should be understood that in a sending process, the network repository network element may directly send a type of a session management network element explicitly to the mobility management network element. Alternatively, the network repository network element may send implicit indication information to indicate a type of a session management network element, for example, 1 represents an intermediate session management network element, 0 represents an anchor session management network element, or 10 represents a combination of an intermediate session management network element and an anchor session management network element. This is not limited in this embodiment of this application.

In an optional embodiment, the method further includes: determining, by the mobility management network element based on the first location information and the identifier of the at least one target session management network element or the information about the service area of the at least one target session management network element, whether the at least one target session management network element supports the first location, where the first location information is used to indicate the first location corresponding to an access network accessed by the terminal device; if the at least one target session management network element cannot support the first location, sending, by the mobility management network element, a second request message to the network repository network element, where the second request message carries the first location information; correspondingly, receiving, by the network repository network element, the second request message sent by the mobility management network element; determining, by the network repository network element based on the first location information, at least one fourth session management network element that supports the first location; sending, by the network repository network element, an identifier of the at least one fourth session management network element to the mobility management network element; and correspondingly, receiving, by the mobility management network element, the identifier of the at least one fourth session management network element sent by the network repository network element based on the second request message, where a type of the at least one fourth session management network element is an intermediate session management network element, and the intermediate session management network element is configured to control a user-plane function network element that interfaces with an access network.

For example, when the first request message does not carry the first location information, at least one target session management network element received by the mobility management network element is a session management network element that supports only a data network name. In this case, the mobility management network element also needs to determine whether the at least one target session management network element supports the first location indicated by the first location information.

If a session management network element that supports the first location exists in the at least one target session management network element, the mobility management network element may directly select, from the at least one target session management network element, the session management network element that supports the first location to provide a service for the terminal device. It should be understood that in this case, the selected session management network element is a combination of an anchor session management network element and an intermediate session management network element.

If a session management network element that supports the first location does not exist in the at least one target session management network element, the mobility management network element may select one session management network element from the at least one target session management network element as an anchor session management network element, and continue to send a second request message to the network repository network element, to request the network repository network element to select an intermediate session management network element. The second request message carries the first location information. The network repository network element selects, based on the second request message, at least one fourth session management network element that supports the first location, and sends the identifier of the at least one fourth session management network element to the mobility management network element. It should be understood that in this case, the at least one fourth session management network element is an intermediate session management network element.

It should be understood that the mobility management network element may determine, based on the information about the service area of the at least one target session management network element, whether the session management network element that supports the first location exists in the at least one target session management network element, or may determine, based on the identifier of the at least one target session management network element, whether the session management network element that supports the first location exists in the at least one target session management network element. For example, the mobility management network element may determine whether a service area of each target session management network element includes the first location. That the service area of the session management network element includes the first location indicates that the session management network element supports the first location. For the second case, the identifier of the session management network element carries the service area indication information, which may indicate the service area of the session management network element. This is not limited in this embodiment of this application.

Optionally, the network repository network element may further send information about a service area of the at least one fourth session management network element to the mobility management network element.

Optionally, the network repository network element may further send priority information and/or load information of the at least one fourth session management network element to the mobility management network element. As such, the mobility management network element selects, based on the priority information and/or load information, one session management network element from the at least one fourth session management network element.

In an optional embodiment, before receiving, by a network repository network element, a first request message sent by a mobility management network element, the method further includes receiving, by the network repository network element, a registration request message or a configuration request message, where the registration request message or the configuration request message includes a data network name supported by at least one session management network element and/or information about a service area of the at least one session management network element. Moreover, the information about the service area of the at least one session management network element is used to indicate a range supported by the at least one session management network element, and the at least one session management network element includes the at least one target session management network element.

For example, for all session management network elements, after a session management network element is powered on, both the session management network element and an operations and management (OAM) network element send a registration request message or configuration request message to the network repository network element, to request to perform registration or configuration for the session management network element. The registration request message may carry a data network name supported by the session management network element and information about a service area of the session management network element. Optionally, the registration request message may further carry S-NSSAI supported by the session management network element.

It should be understood that one session management network element may support a plurality of combinations of a data network name and S-NSSAI. For each combination of a data network name and S-NSSAI, service areas of the session management network element may be different. For example, a service area of the session management network element for S-NSSAI 1 and a service area of the session management network element for S-NSSAI 1 may be the same or different. If the session management network element has different service area information for different combinations of a data network name and S-NSSAI, the session management network element may provide information about a service area corresponding to each combination of a data network name and S-NSSAI supported by the session management network element.

After receiving the registration request or configuration request for the session management network element, the network repository network element may store the information corresponding to the session management network element.

In a possible implementation, in an example in which the session management network element is an SMF network element and the data network name is a DNN, the network repository network element may store the following information as shown in Table 1.

TABLE 1

| SMF identifier | S-NSSAI | DNN | Service area |
|---|---|---|---|
| SMF 1 | S-NSSAI 1 | DNN 1 | TAI 1 . . . |
| SMF 1 | S-NSSAI 1 | DNN 2 | TAI 2 . . . |
| SMF 1 | S-NSSAI 2 | DNN 3 | TAI 3 . . . |

It should be understood that, in Table 1, when information about service areas is the same, the network repository network element may store a plurality of pieces of information, or may store one piece of information about the service area for the SW' 1. This is not limited in this embodiment of this application.

In an optional embodiment, when the terminal device moves and a connection of the terminal device is switched from a source access network to a target access network, the method further includes: determining, by the mobility management network element based on a second location and an identifier of a source session management network element or information about a service area of a source session management network element, whether to reselect a target intermediate session management network element for the terminal device, where the source session management network element is configured to control a user-plane function network element that interfaces with the source access network, the target intermediate session management network element is configured to control a user-plane function network element that interfaces with the target access network, and the second location is a location corresponding to the target access network accessed by the terminal device; when the mobility management network element determines that the target intermediate session management network element needs to be reselected for the terminal device, sending, by the mobility management network element, second location information to the network repository network element, where the second location information is used to indicate the second location corresponding to the target access network accessed by the terminal device; correspondingly, receiving, by the network repository network element, the second location information sent by the mobility management network element; determining, by the network repository network element based on the second location information, at least one fifth session management network element that supports the second location, where the at least one fifth session management network element can control a user-plane function network element that interfaces with the target access network; sending, by the network repository network element, an identifier of the at least one fifth session management network element to the mobility management network element; and correspondingly, receiving, by the mobility management network element, the identifier of the at least one first session management network element sent by the network repository network element.

For example, when the terminal device moves and is switched from a source access network to a target access network, a case may occur that a session management network element (referred to as a source session management network element in this specification) that originally provides a service for the terminal device cannot continue to provide the service for the terminal device because the session management network element does not support location information of the terminal device. In this case, the mobility management network element needs to determine, based on the identifier of the source session management network element or information about a service area of the source session management network element, and the second location corresponding to the target access network currently accessed by the terminal device, whether a target intermediate session management network element needs to be re-selected. When the mobility management network element determines that the target intermediate session management network element needs to be re-selected, the mobility management network element may send the second location information to the network repository network element, such that the network repository network element selects at least one fifth session management network element based on the second location information. The mobility management network element selects one session management network element from the at least one fifth session management network element as a new intermediate session management network element, to ensure that a PDU session is not interrupted during movement of the terminal device.

It should be understood that the source session management network element may control the user-plane function network element that interfaces with the source access network. Additionally, the source session management network element may be a combination of an intermediate session management network element and an anchor point session management network element, or may be an intermediate session management network element. This is not limited in this embodiment of this application.

It should also be understood that the second location information may carry an identifier of a target base station accessed by the terminal device, an identifier of a TAI, an identifier of a cell of a base station accessed by the terminal device, and the like. This is not limited in this embodiment of this application.

In an optional embodiment, determining, by the mobility management network element based on a second location and an identifier of a source session management network element or information about a service area of a source session management network element, whether to reselect a target intermediate session management network element for the terminal device includes: determining, by the mobility management network element, whether the source session management network element supports the second location; and when the source session management network element cannot support the second location, determining, by the mobility management network element, that the target intermediate session management network element is reselected for the terminal device.

For ease of understanding, the following describes the embodiments of this application in detail with reference to FIG. 4A to FIG. 6B using an example in which the mobility management network element is an AMF, the network repository network element is an NRF, and the terminal device is a UE.

Figure 4A:
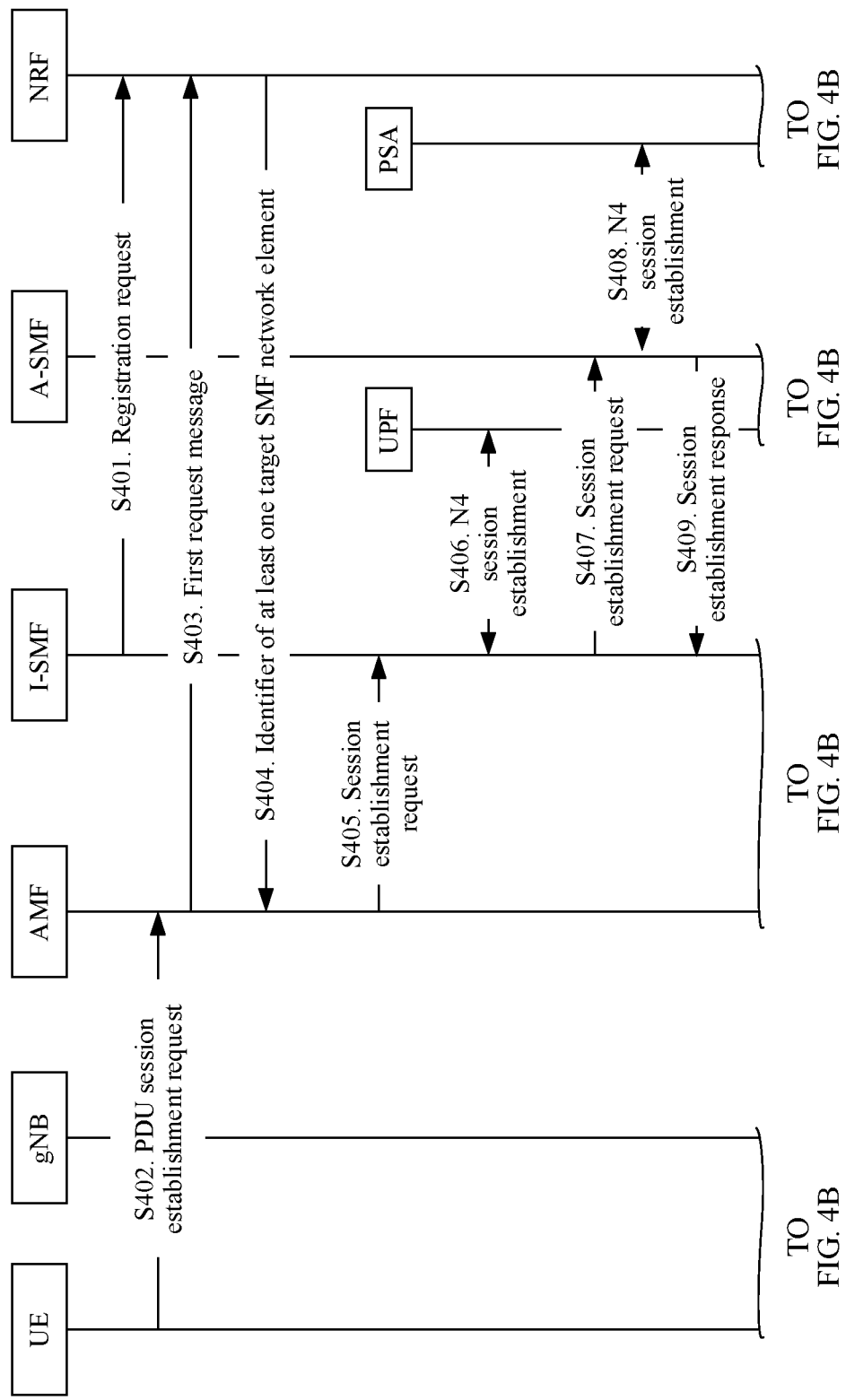
FIG. 4A and FIG. 4B are schematic flowcharts of another communication method according to an embodiment of this application.
Figure 4B:
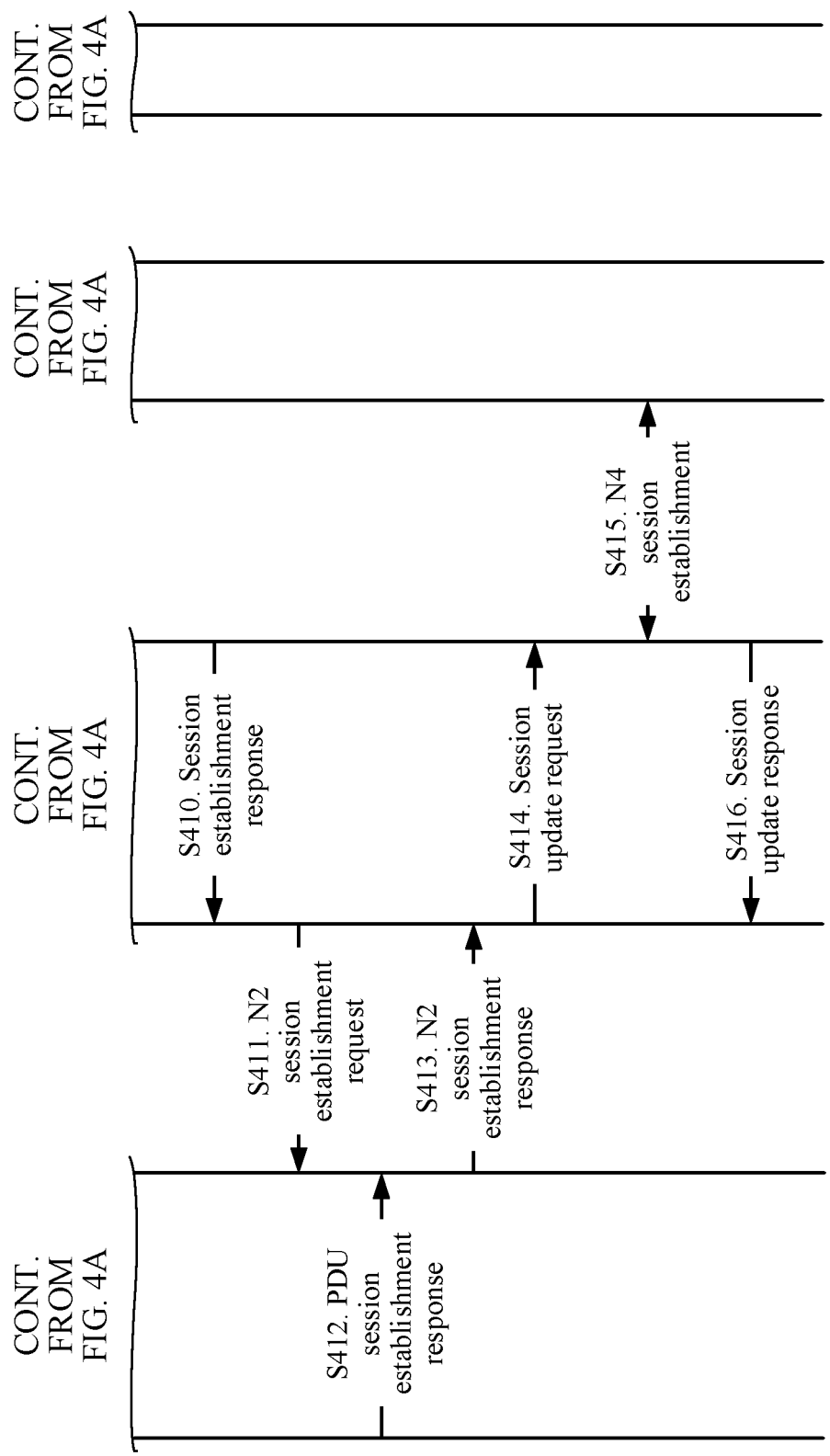

FIG. 4A and FIG. 4B are schematic flowcharts of a communication method 400 according to an embodiment of this application. The method 400 may be applied to the system architecture 100 shown in FIG. 1, or may be applied to the application scenario 200 shown in FIG. 2. This embodiment of this application is not limited thereto.

In step S401, an SMF sends a registration request to an NRF to request registration in the NRF, such that another network element may obtain information about the SMF from the NRF. Correspondingly, the NRF receives the registration request and stores related information carried by the SMF in the registration request.

For example, the registration request may carry an identifier of the SMF, a DNN supported by the SMF, S-NSSAI, information about a service area of the SMF, and the like, where the service area of the SMF is a range in which the SMF can provide a service. It should be understood that the SMF herein may be any SMF.

It should be understood that in this embodiment, an example in which the SMF sends a registration request to the NRF for registration is used. During practical use, an OAM may configure the information about the SMF into the NRF, that is, the OAM sends a configuration request message to the NRF. However, this is not limited in this embodiment of this application.

In step S402, a UE sends a PDU session establishment request to an AMF to request to establish a PDU session for the UE. Correspondingly, the AMF receives the PDU session establishment request sent by the UE.

For example, the PDU session establishment request may carry a DNN of the PDU session that the UE requests to establish. The message is sent to the AMF using an access network. When forwarding the message, the access network simultaneously sends first location information of the UE to the AMF. The first location information may carry, for example, an identifier of a base station currently accessed by the UE, an identifier of a cell currently accessed by the UE, and an identifier of a TAI corresponding to the base station currently accessed by the UE. It should be understood that if the PDU session establishment request of the UE does not carry the DNN, the AMF may determine the DNN of the PDU session based on subscription data of the UE.

Optionally, the PDU session establishment request may further carry the S-NSSAI.

In step S403, after receiving the PDU session establishment request, the AMF sends a first request message to the NRF to request the NRF to select the SMF for the UE. Correspondingly, the NRF receives the first request message.

The first request message may carry the DNN of the PDU session that the UE requests to establish and the first location information of the UE.

Optionally, the first request message may further carry the S-NSSAI.

In step S404, the NRF selects at least one target SMF for the UE based on the first request message, and sends an identifier of the at least one target SMF to the AMF. Correspondingly, the AMF receives the identifier of the at least one target SMF sent by the NRF.

For example, the at least one target SMF may include at least one I-SMF and at least one A-SMF, or may include a combination of at least one I-SMF and an A-SMF.

Optionally, the NRF may further send information about a service area of the at least one target SMF to the AMF.

Optionally, the NRF may further send priority information and load information of the at least one target SMF to the AMF.

Optionally, the NRF further sends a type of the at least one target SMF to the AMF.

Optionally, if a network repository network element selects a second SMF network element (an A-SMF network element) and a third SMF network element (an I-SMF network element), the network repository network element may send a type of the second SMF network element and/or a type of the third SMF network element to the mobility management network element, or may implicitly send a type of the second SMF network element and/or a type of the third SMF network element, and the mobility management network element itself determines the types based on information about a service area of the second SMF network element and information about a service area of the third SMF network element, or based on an identifier of the second SMF network element and an identifier of the third SMF network element.

If the network repository network element selects a group of second SMF network elements (an A-SMF network element) and a group of third SMF network elements (an I-SMF network element), the network repository network element needs to send a type of the group of second SMF network elements and a type of the group of third SMF network elements to the mobility management network element.

In step S405, the AMF sends a session establishment request to the SMF. The session establishment request may further carry the first location information described above.

If the at least one target SMF in step S404 includes a combination of an I-SMF and an A-SMF, the AMF directly sends the session establishment request to the combination of the I-SMF and the A-SMF.

If the at least one target SMF in step S404 includes a combination of a group of I-SMFs and an A-SMF, the AMF may select one SMF from the at least one target SMF based on the first location information, priority information of the combination of the group of I-SMFs and the A-SMF, load information, and the like. The AMF may then send the session establishment request to the SMF. For example, the AMF may first select an SMF that most closely matches a first location of the UE (matching is better when a current location of the UE is closer to a central location of the service area of the SMF). If there are still a plurality of SMFs that may provide a service for the UE, the AMF may then select an SMF based on priority information and load information of remaining SMFs.

If the at least one target SMF in step S404 includes an I-SMF and an A-SMF, the AMF sends the session establishment request to the I-SMF, and the session establishment request carries information about the A-SMF selected by the NRF in step S404.

If the at least one target SMF in step S404 includes a group of I-SMFs and a group of A-SMFs, the AMF first selects one I-SMF from the group of I-SMFs based on priority information, load information, and the like of the group of I-SMFs, and one A-SMF from the group of A-SMFs based on priority information, load information, and the like of the group of A-SMFs. The AMF then sends the session establishment request to the selected I-SMF, where the session establishment request carries information about the selected A-SMF. Optionally, the AMF may alternatively select the A-SMF closest to the first location of the UE based on an identifier of each A-SMF in a group of A-SMFs, where the identifier of the A-SMF includes location information of the A-SMF.

In step S406, the I-SMF selects a UPF based on the first location information and sends an N4 session establishment request to the UPF. In this step, the I-SMF or UPF assigns uplink and downlink tunnel information of the UPF to the session.

In step S407, the I-SMF sends a session establishment request to the A-SMF, and correspondingly, the A-SMF receives the session establishment request sent by the I-SMF. The session establishment request may carry information such as the first location information and a DNN.

Optionally, the session establishment request may further carry S-NSSAI.

In step S408, the A-SMF selects a PSA (also referred to as an A-UPF) based on the DNN and first location information. The A-SMF sends an N4 session establishment request message to the PSA, and sends, to the PSA, the downlink tunnel information of UPF assigned in step S406, to establish a downlink tunnel from PSA to UPF.

In step S409, the A-SMF sends a session establishment response to the I-SMF. The session establishment response may carry the uplink tunnel information of the PSA.

In step S410, the I-SMF sends a session establishment response to the AMF. In this message, the I-SMF sends an N2 session request message and an NAS session establishment response to the AMF, where the N2 session request message is used to request an access network element (namely, a gNB) to allocate a resource for the session. The N2 session request message includes QoS information corresponding to the session, UPF uplink tunnel information, and the like. The NAS session establishment response message is used to send to the UE and notify the UE that the session is established successfully.

In step S411, the AMF sends the N2 session request message and the NAS session establishment response message to the gNB.

In step S412, the gNB configures an air interface resource for the session based on the N2 session request message, and sends the NAS session establishment response message to the UE.

In step S413, the gNB sends an N2 session response message to the AMF. The N2 session response message carries downlink tunnel information of the gNB.

In step S414, the AMF sends a session update request to the I-SMF, and the session update request carries the N2 session response message sent by the gNB.

In step S415, the I-SMF sends the downlink tunnel information of gNB and the uplink tunnel information of the PSA to the UPF, to establish an uplink tunnel and a downlink tunnel of the PDU session.

In step S416, the I-SMF sends a session update response message to the AMF.

It should be understood that sequence numbers of the foregoing processes do not mean execution sequences. The execution sequences of the processes should be determined according to functions and internal logic of the processes, and should not be construed as any limitation on the implementation processes of this embodiment of this application.

In the communication method in this embodiment of this application, when a session is established, the SMF that provides a service for a terminal device can be determined based on the location information of the terminal device and a service range of the session anchor SMF, to ensure that the terminal device can access a data network that the terminal device wants to access at any position, thereby improving system performance.

Figure 5B:
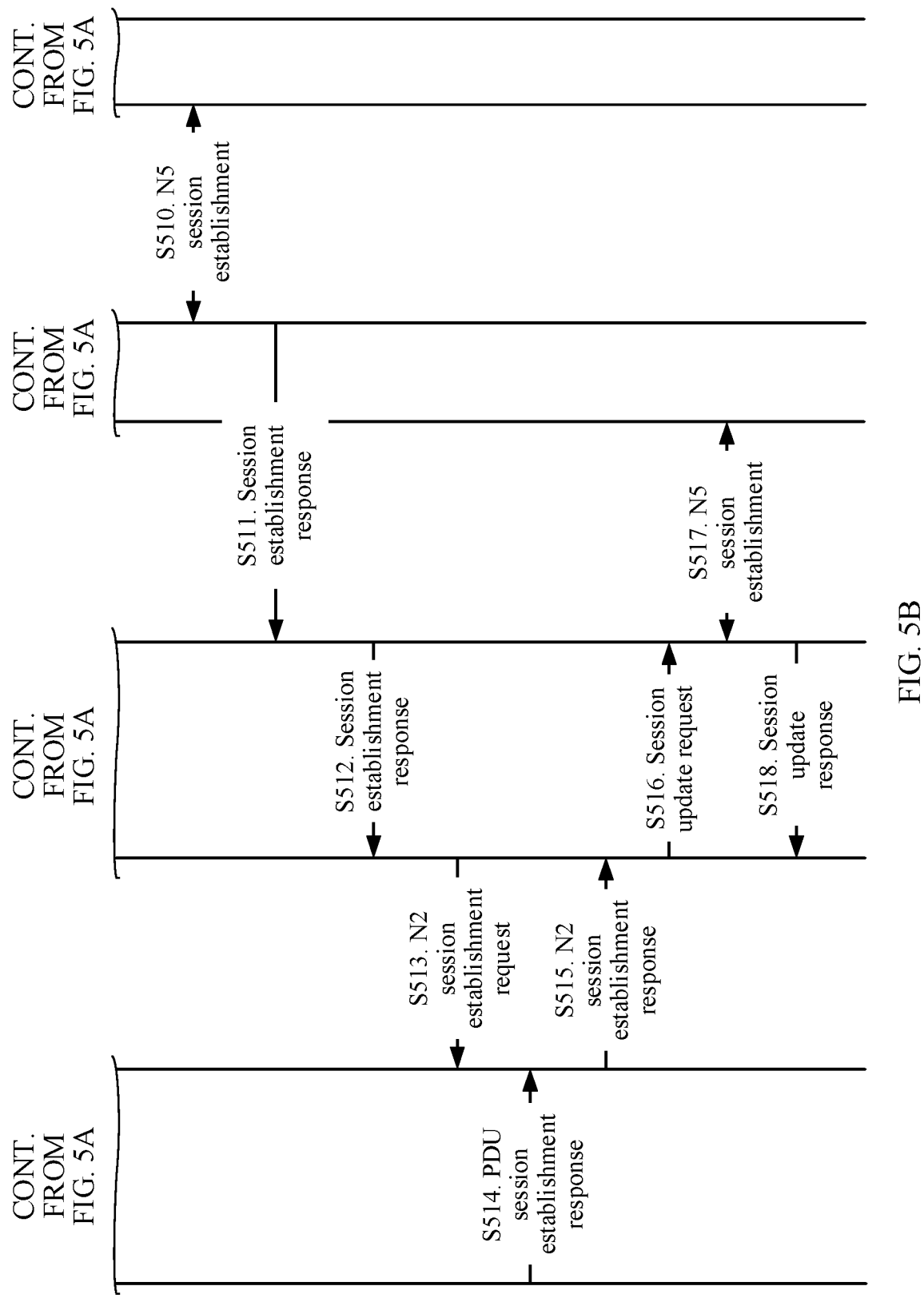

FIG. 5A and FIG. 5B are schematic flowcharts of a communication method 500 according to an embodiment of this application. The method 500 may be applied to the system architecture 100 shown in FIG. 1, or may be applied to the application scenario 200 shown in FIG. 2. This embodiment of this application is not limited thereto.

Steps S501 and S502 are the same as steps S301 and S302 in method 300. Details are not described herein again.

In step S503, after receiving a PDU session establishment request, an AMF sends a first request message to an NRF to request the NRF to select an SMF for UE. Correspondingly, the NRF receives the first request message. For example, the first request message carries a DNN of a PDU session that the UE requests to establish.

Optionally, the first request message may further carry S-NSSAI.

In step S504, the NRF determines all SMFs that support the DNN as target SMFs based on the first request message, and sends an identifier of at least one target SMF to the AMF. Correspondingly, the AMF receives the identifier of the at least one target SMF sent by the NRF.

Optionally, when the first request message carries the S-NSSAI, the NRF determines the SMF supporting the DNN and the S-NSSAI as the target SMF.

Optionally, the NRF may further send information about a service area of the at least one target SMF to the AMF.

Optionally, the NRF may further send priority information and load information of the at least one target SMF to the AMF.

The AMF may determine, based on first location information of the UE, whether an SMF that supports a first location represented by the first location information exists in information about the service area of the at least one target SMF.

Optionally, the AMF may determine, based on configuration, whether the SMF that supports a first location represented by the first location information exists in at least one SMF. For example, if the information about the service area of the at least one SMF is not configured in the AMF, the AMF determines that the at least one SMF does not support the SMF of the first location. Otherwise, if the AMF is configured with the information about the service area of the at least one SMF, the AMF determines, based on the configured information about the service area of the at least one SMF, whether the SMF that supports the first location represented by the first location information exists in the at least one target SMF.

Optionally, the AMF may alternatively determine, based on an identifier of the SMF, whether the SMF that supports a first location represented by the first location information exists in at least one SMF. For example, if the identifier of the SMF includes information about an area in which the SMF is located, the AMF determines, based on information about an area, indicated by the identifier of the SMF, in which the SMF is located, whether the SMF that supports the first location represented by the first location information exists in the at least one SMF. It is assumed that an identifier of an SMF is smf.nanjing.jiangsu.cmcc. Based on the identifier, it can be determined that the SMF serves Nanjing area of China Mobile. If the UE is currently in Shanghai, that is, the first location information indicates Shanghai, the AMF may determine that the SMF cannot support the SMF that supports the first location represented by the first location information.

Optionally, if the AMF is not configured with information about service areas of some SMFs in the at least one SMF, and the AMF cannot determine, based on the identifier of the SMF, whether the SMF supports the first location identified by the first location information, the AMF may further obtain the information about the service area of the SMF from the NRF. For example, the AMF may send a service area request message to the NRF, and the service area request message carries the identifier of the SMF. The NRF obtains the information about the service area of the SMF based on the identifier of the SMF and sends the information about the service area to the AMF. After obtaining the information about the service area of the SMF, the AMF may determine, based on the information about the service area of the SMF and the first location information, whether the SMF supports the first location identified by the first location information.

If there is an SMF, the AMF may select the SMF directly. If there are a plurality of SMFs, the AMF may randomly select one SMF to provide a service for the UE. When the NRF sends the priority information and the load information of the at least one target SMF to the AMF, the AMF may further select, based on information such as a service area, a priority, and load of the plurality of SMFs, one SMF from the plurality of SMFs to provide a service for the UE. This is not limited in this embodiment of this application. It should be understood that in this case, a type of the SMF is a combination of an A-SMF and an I-SMF, steps S505 and S506 do not need to be performed, and step S507 is directly performed.

If an SMF that can support the first location does not exist in the at least one target SMF, the AMF selects one SMF from the at least one target SMF as the A-SMF; and step S505 is further performed.

In step S505, the AMF sends a second request message to the NRF, and the second request message is used to request the NRF to select an I-SMF for the UE. Correspondingly, the NRF receives the second request message sent by the AMF. The second request message may carry the first location information of the UE.

Optionally, the second request message may further carry the S-NSSAI.

In step S506, the NRF selects, based on the first location information, at least one fourth SMF that can support the first location, and sends an identifier of the at least one fourth SMF to the AMF.

Optionally, when the second request message carries the S-NSSAI, the NRF selects at least one fourth SMF that can support the first location and the S-NSSAI.

Optionally, the NRF may further send priority information and load information of the at least one fourth SMF to the AMF.

Optionally, the NRF may further send information about a service area of the at least one fourth SMF to the AMF.

Steps S507 to S518 are the same as steps S405 to S416. Details are not described herein again.

It should be understood that step S505 may be performed before step S503, that is, the AMF may first select at least one I-SMF based on the first location of the UE. In this case, the NRF further needs to send a DNN supported by the at least one I-SMF to the AMF. The AMF determines, based on the DNN supported by the at least one I-SMF, whether an SMF that supports a DNN corresponding to the PDU session of the UE exists in the at least one I-SMF. If the SMF exists, the AMF selects the SMF as a combination of the I-SMF and the A-SMF. Otherwise, the AMF selects one SMF from the at least one I-SMF as the I-SMF, and step S503 is performed, that is, the AMF requests the NRF to select an A-SMF that supports the DNN corresponding to the PDU session of the UE.

It should be understood that sequence numbers of the foregoing processes do not mean execution sequences. The execution sequences of the processes should be determined according to functions and internal logic of the processes, and should not be construed as any limitation on the implementation processes of this embodiment of this application.

In the communication method in this embodiment of this application, when a session is established, the SMF that provides a service for a terminal device can be determined based on the location information of the terminal device and a service range of the session anchor SMF, to ensure that the terminal device can access a data network that the terminal device wants to access at any position, thereby improving system performance.

Figure 6B:
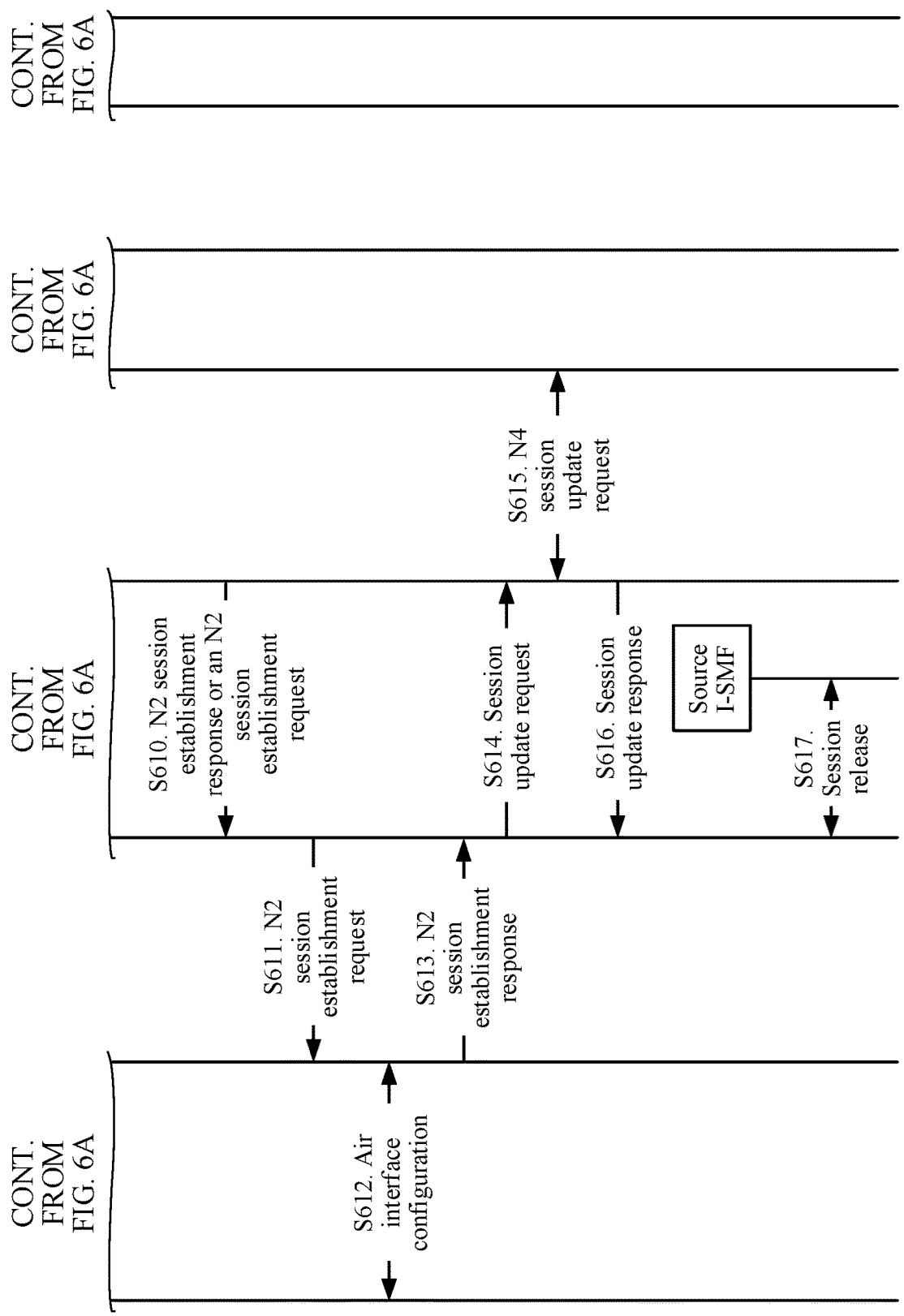

FIG. 6A and FIG. 6B are schematic flowcharts of a communication method 600 according to an embodiment of this application. The method 600 may be applied to the system architecture 100 shown in FIG. 1, or may be applied to the application scenario 200 shown in FIG. 2. This embodiment of this application is not limited thereto.

In step S601, an AMF receives a registration request or a path switch request.

It should be understood that in this case, a location of a UE moves, and a connection of the UE is switched from a source access network to a target access network. In the message, the AMF obtains second location information of the UE, and the second location information is used to indicate a second location corresponding to the target access network. Before receiving the message, the UE has established a PDU session, and during establishment of the PDU session, the AMF stores information about a service area of an SMF corresponding to the session.

For example, step S601 may be step S601a or step S601b.

S601a. The UE sends the registration request to the AMF, and correspondingly, the AMF receives the registration request sent by the UE.

S601b. A gNB sends the path switch request to the AMF, and correspondingly, the AMF receives the path switch request sent by the UE. The path switch request may carry an N2 session request message, and the N2 session request message carries downlink tunnel information of the PDU session corresponding to the gNB.

In step S602, the AMF determines whether a new I-SMF (referred to as a target I-SMF herein) needs to be selected for the UE.

Optionally, the AMF may determine, based on the second location information, and information about a service area of a source I-SMF or an identifier of the I-SMF, whether a new I-SMF needs to be selected for the UE. For example, the method of determining, by the AMF based on the second location information, the information about the service area of the source I-SMF or the identifier of the I-SMF, whether the new I-SMF needs to be selected for the UE is similar to the determining method of step S404 in method 500. Details are not described herein again.

If the service area of the source I-SMF can support the second location, and the AMF determines that the target I-SMF does not need to be selected for the UE, the procedure ends.

If the service area of the source I-SMF cannot support the second location, and the AMF determines that the target I-SMF needs to be selected for the UE, step S603 is further performed.

Optionally, after the AMF finds that the location of the UE changes, whether the I-SMF supports the second location, the AMF may directly perform steps S503 and S504, that is, the AMF always requests an NRF to select at least one target I-SMF based on the second location information, that is, step S602 is not performed.

In step S603, the AMF sends the second location information to the NRF, to request the NRF to select for the UE an I-SMF that supports a current access location (namely, the second location).

Optionally, the AMF may further send S-NSSAI to the NRF.

In step S604, the NRF selects at least one fifth SMF based on the second location information, and sends an identifier of the at least one fifth SMF to the AMF. If the NRF sends a group of fifth SMFs, the AMF selects one fifth SMF from the group of fifth SMFs as the I-SMF.

Optionally, when the AMF sends the S-NSSAI to the NRF, the NRF may select the at least one fifth SMF in combination with the second location information and the S-NSSAI.

Optionally, the NRF may further send information about a service area, priority information, load information, and the like of the at least one fifth SMF to the AMF, such that the AMF selects one fifth SMF as the I-SMF based on the information.

It should be understood that in step S602, if the AMF does not determine, based on the second location information, the information about the service area of the source I-SMF or the identifier of the I-SMF, whether the new I-SMF needs to be selected for the UE, in step S604, the AMF may further determine whether the source I-SMF is included in the at least one target I-SMF. If the source I-SMF is not included, the AMF selects one I-SMF from the at least one target I-SMF as the target I-SMF, and subsequent steps are further performed. If the source I-SMF is included in the at least one target I-SMF, the AMF determines that the source I-SMF continues to provide a service for the PDU session of the UE, and the AMF may initiate session update according to an existing procedure and does not perform subsequent steps.

In step S605, if the AMF selects the target I-SMF, the AMF sends a session establishment request to the target I-SMF.

Optionally, if step S601 is S601b, the AMF sends, to the target I-SMF, the downlink tunnel information of the PDU session corresponding to the gNB.

In step S607, the target I-SMF sends a session update request to the A-SMF, where the message carries downlink tunnel information corresponding to a new UPF.

In step S608, the A-SMF sends an N4 session update request to a PSA, and sends the downlink tunnel information of the new UPF to the PSA.

In step S609, the A-SMF sends a session update response message to the target I-SMF, and sends uplink tunnel information of the PSA to the target I-SMF.

In step S610, the target I-SMF sends an N2 session establishment response or an N2 session establishment request to the AMF.

If step S601 is S601a and the session does not need to be activated, the procedure ends. If step S601 is S601a and the session needs to be activated, the target I-SMF sends the N2 session establishment request, and uplink tunnel information of the new UPF is carried in the N2 session establishment request.

If step S601 is S601b, the target I-SMF sends the N2 session establishment response, and the uplink tunnel information of the new UPF is carried in the session establishment response. The AMF receives the N2 session establishment response from the target I-SMF, and the procedure ends.

In step S611, when step S601 is S601a and the session needs to be activated, a message received by the AMF from the target I-SMF is the N2 session establishment request. The AMF sends the N2 session establishment request received from the target I-SMF to the gNB, and the gNB stores the uplink tunnel information of the new UPF carried in the N2 session establishment request.

In step S612, if the gNB receives the N2 session establishment request, the gNB configures a radio resource for the UE based on the N2 session establishment request.

In step S613, if the gNB receives the N2 session establishment request, the gNB sends a N2 session establishment response to the AMF, and the message carries downlink tunnel information of the session corresponding to the gNB.

In step S614, if the AMF receives the N2 session establishment response from the gNB in step S613, the AMF sends a session update request to the target I-SMF. The message carries the N2 session establishment response sent by the gNB.

In step S615, the target I-SMF sends an N4 session update request to the new UPF, and sends downlink tunnel information of the gNB and the uplink tunnel information of the PSA to the new UPF.

In step S616, the target I-SMF sends a session update response to the AMF.

In step S617, if the source I-SMF (namely, a case in which the A-SMF and an I-SMF form a combination) exists, the AMF sends a session release request to the source I-SMF, and the source I-SMF releases a related resource on a source UPF and deletes a session context.

According to the communication method in this embodiment of this application, the AMF determines, based on the information about the service area of the SMF and a current location of the UE, whether the target I-SMF needs to be selected for the UE. If the target I-SMF needs to be selected, the AMF selects the target I-SMF based on the current location of the UE, and inserts the target I-SMF into a session path, thereby ensuring that a session of the UE is not interrupted when the UE moves.

It should be understood that sequence numbers of the foregoing processes do not mean execution sequences. The execution sequences of the processes should be determined according to functions and internal logic of the processes, and should not be construed as any limitation on the implementation processes of this embodiment of this application.

The communication methods according to the embodiments of this application are described above in detail with reference to FIG. 1 to FIG. 6B. Communications apparatuses according to the embodiments of this application are described below in detail with reference to FIG. 7 to FIG. 9.

Figure 7:
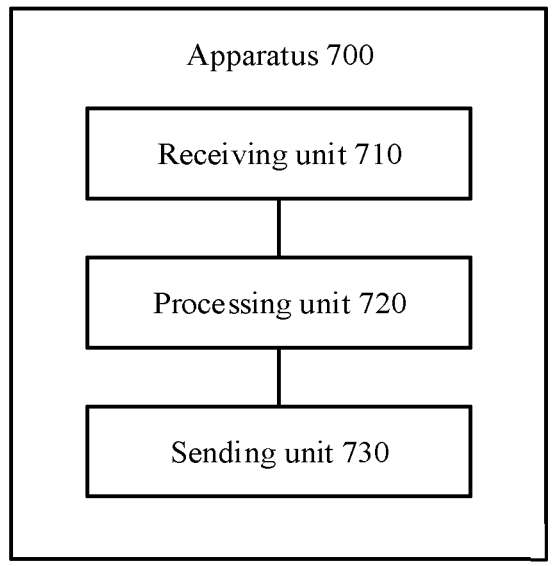
FIG. 7 is a schematic block diagram of a communications apparatus according to an embodiment of this application.

FIG. 7 shows a communications apparatus 700 according to an embodiment of this application. The apparatus 700 may be the foregoing network device, and the network device may be a subscriber data management network element or an access and mobility management function device. The apparatus 700 includes: a receiving unit 710 configured to receive a first request message from a mobility management network element, where the first request message carries a data network name of a session that a terminal device requests to establish; a processing unit 720 configured to determine, based on the first request message, at least one target session management network element from session management network elements that support the data network name; and a sending unit 730 configured to send an identifier of the at least one target session management network element to the mobility management network element.

Optionally, the sending unit 730 is further configured to send information about a service area of the at least one target session management network element to the mobility management network element.

Optionally, the first request message further carries first location information, and the first location information is used to indicate a first location corresponding to an access network accessed by the terminal device. The processing unit 720 is configured to determine, based on the first location information and the data network name, the at least one target session management network element from the session management network elements that support the data network name.

Optionally, the processing unit 720 is configured to: determine, based on the first location information and the data network name, whether at least one first session management network element that supports the first location and the data network name exists; and if the at least one first session management network element does not exist, select at least one second session management network element that supports the data network name and at least one third session management network element that supports the first location, as the at least one target session management network element. The sending unit 730 is configured to send an identifier of the at least one second session management network element and an identifier of the at least one third session management network element to the mobility management network element.

Optionally, the sending unit 730 is further configured to send a type of the at least one second session management network element and a type of the at least one third session management network element to the mobility management network element. The type of the at least one second session management network element is an anchor session management network element, and the type of the at least one third session management network element is an intermediate session management network element. The anchor session management network element is configured to control a session anchor user-plane function network element, and the intermediate session management network element is configured to control a user-plane function network element that interfaces with an access network.

Optionally, the processing unit 720 is configured to: determine, based on the first location information and the data network name, whether at least one first session management network element that supports the first location and the data network name exists; and if the at least one first session management network element exists, use the at least one first session management network element as the at least one target session management network element. The sending unit 730 is configured to send an identifier of the at least one first session management network element to the mobility management network element.

Optionally, the sending unit 730 is further configured to send the type of the at least one first session management network element to the mobility management network element. The type of the at least one first session management network element is an anchor session management network element and an intermediate session management network element. The anchor session management network element is configured to control a session anchor user-plane function network element, and the intermediate session management network element is configured to control a user-plane function network element that interfaces with an access network.

Optionally, the receiving unit 710 is further configured to receive a second request message from the mobility management network element, where the second request message carries first location information, which is used to indicate a first location corresponding to an access network accessed by the terminal device. The processing unit 720 is further configured to determine, based on the first location information, at least one fourth session management network element that supports the first location. The sending unit 730 is further configured to send an identifier of the at least one fourth session management network element to the mobility management network element.

Optionally, the receiving unit 710 is further configured to receive a registration request message or a configuration request message, where the registration request message or the configuration request message includes information about a service area of at least one session management network element. The information about the service area of the at least one session management network element is used to indicate a range supported by the at least one session management network element, and the at least one session management network element includes the at least one target session management network element.

Optionally, the receiving unit 710 is further configured to receive second location information of the terminal device from the mobility management network element, and the second location information is used to indicate a second location corresponding to the target access network accessed by the terminal device. The processing unit 720 is further configured to determine, based on the second location information, at least one fifth session management network element that supports the second location, and the at least one fifth session management network element can control a user-plane function network element that interfaces with the target access network. The sending unit 730 is further configured to send an identifier of the at least one fifth session management network element to the mobility management network element.

It should be understood that the apparatus 700 herein may be embodied in a form of a functional unit. The term "unit" herein may be an application-specific integrated circuit (ASIC), an electronic circuit, a processor (such as a shared processor, a special purpose processor, or a group of processors) for executing one or more software or firmware programs, and a memory, a combined logic circuit, and/or another suitable component that supports the described functions. In an optional example, the apparatus 700 may be the network repository network element in the foregoing method embodiment, and the apparatus 700 may be configured to perform processes and/or steps corresponding to the network repository network element in the foregoing method embodiment. To avoid repetition, details are not described herein again.

Figure 8:
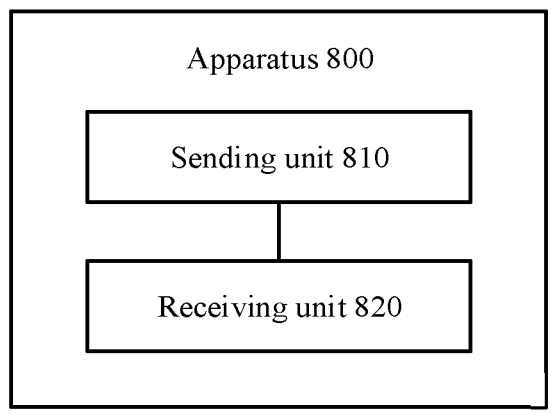
FIG. 8 is a schematic block diagram of another communications apparatus according to an embodiment of this application.

FIG. 8 shows a communications apparatus 800 according to an embodiment of this application. The apparatus 800 may be the foregoing terminal, and the apparatus 800 includes: a sending unit 810 configured to send a first request message to a network repository network element, where the first request message carries a data network name of a session that a terminal device requests to establish; and a receiving unit 820 configured to receive an identifier of at least one target session management network element from the network repository network element.

Optionally, the receiving unit 820 is further configured to receive information about a service area of the at least one target session management network element from the network repository network element.

Optionally, the first request message further carries first location information, and the first location information is used to indicate a first location corresponding to an access network accessed by the terminal device. The receiving unit 820 is configured to receive, by the mobility management network element, an identifier of a second session management network element and an identifier of a third session management network element from the network repository network element.

Optionally, the apparatus further includes a first processing unit configured to determine a type of the second session management network element and a type of the third session management network element based on information about a service area of the second session management network element, information about a service area of the third session management network element, and the first location information. The type is an anchor session management network element or an intermediate session management network element. The anchor session management network element is configured to control a session anchor user-plane function network element, and the intermediate session management network element is configured to control a user-plane function network element that interfaces with an access network.

Optionally, the receiving unit 820 is configured to receive, from the network repository network element, the information about the service area of the second session management network element and the information about the service area of the third session management network element.

Optionally, the apparatus further includes a second processing network element configured to determine, based on the first location information and the identifier of the at least one target session management network element or the information about the service area of the at least one target session management network element, whether the at least one target session management network element supports the first location, where the first location information is used to indicate the first location corresponding to an access network accessed by the terminal device. The sending unit 810 is further configured such that if the at least one target session management network element cannot support the first location, the sending unit 810 sends a second request message to the network repository network element, where the second request message carries the first location information. The receiving unit 820 is further configured to receive an identifier of at least one fourth session management network element from the network repository network element, where a type of the at least one fourth session management network element is an intermediate session management network element. Additionally, the intermediate session management network element is configured to control a user-plane function network element that interfaces with an access network.

Optionally, the apparatus further includes a third processing unit configured to determine, based on a second location and an identifier of a source session management network element or information about a service area of a source session management network element, whether to reselect a target intermediate session management network element for the terminal device. The source session management network element is configured to control a user-plane function network element that interfaces with the source access network, the target intermediate session management network element is configured to control a user-plane function network element that interfaces with the target access network, and the second location is a location corresponding to the target access network accessed by the terminal device.

The sending unit 810 is further configured to send second location information to the network repository network element, and the second location information is used to indicate the second location corresponding to the target access network accessed by the terminal device. The receiving unit 820 is further configured to receive an identifier of at least one fifth session management network element from the network repository network element, where the identifier of the at least one fifth session management network element is determined based on the second location information.

Optionally, the third processing unit is configured to: determine, whether the source session management network element supports the second location; and when the source session management network element cannot support the second location, determine that the target intermediate session management network element is reselected for the terminal device.

It should be understood that the apparatus 800 herein may be embodied in a form of a functional unit. The term "unit" herein may be an application-specific integrated circuit (ASIC), an electronic circuit, a processor (such as a shared processor, a special purpose processor, or a group of processors) for executing one or more software or firmware programs, and a memory, a combined logic circuit, and/or another suitable component that supports the described functions. In an optional example, the apparatus 800 may be the mobility management network element in the foregoing method embodiment, and the apparatus 800 may be configured to perform processes and/or steps corresponding to the mobility management network element in the foregoing method embodiment. To avoid repetition, details are not described herein again.

The apparatuses 700 and 800 in the foregoing solutions have functions of implementing corresponding steps performed by the network repository network element and the mobility management network element in the foregoing methods. The functions may be implemented by hardware, or may be implemented by hardware executing corresponding software. The hardware or software includes one or more modules corresponding to the foregoing functions. For example, a sending unit may be replaced by a transmitter, a receiving unit may be replaced by a receiver, and another unit, such as a determining unit, may be replaced by a processor, to respectively perform a transceiving operation and a related processing operation in each method embodiment.

In this embodiment of this application, the apparatuses in FIG. 7 and FIG. 8 may also be a chip or a chip system, such as a system on chip (SoC). Correspondingly, the receiving unit and the sending unit may be a transceiver circuit of the chip, which is not limited herein.

Figure 9:
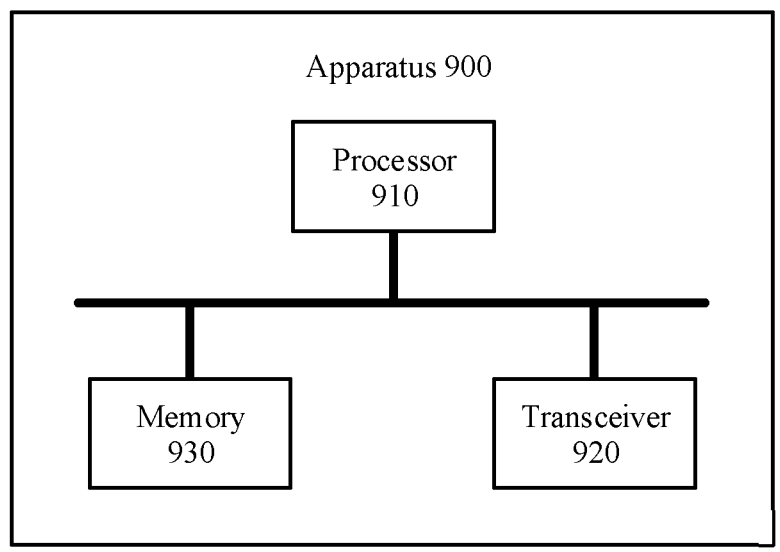
FIG. 9 is a schematic block diagram of another communications apparatus according to an embodiment of this application.

It should be understood that the network repository network element in FIG. 7 or the mobility management network element in FIG. 8 in this embodiment of this application may be implemented by using a communications apparatus 900 in FIG. 9, and may be configured to perform steps and/or procedures corresponding to the network repository network element or the mobility management network element in the foregoing method embodiments.

FIG. 9 shows another communications apparatus 900 according to an embodiment of this application. The apparatus 900 includes a processor 910, a transceiver 920, and a memory 930. The processor 910, the transceiver 920, and the memory 930 communicate with each other by using an internal connection channel. The memory 930 is configured to store an instruction. The processor 910 is configured to execute the instruction stored in the memory 930, to control the transceiver 920 to send a signal and/or to receive a signal.

If the communications apparatus 900 is a network repository network element, the processor 910 is configured to: receive, by using the transceiver 920, a first request message from a mobility management network element, where the first request message carries a data network name of a session that a terminal device requests to establish; determine, based on the first request message, at least one target session management network element from session management network elements that support the data network name; and send, by using the transceiver 920, an identifier of the at least one target session management network element to the mobility management network element.

If the communications apparatus 900 is a mobility management network element, the transceiver 920 is configured to: send, by using the transceiver 920, a first request message to a network repository network element, where the first request message carries a data network name of a session that a terminal device requests to establish; and receive, by using the transceiver 920, an identifier of at least one target session management network element from the network repository network element.

Optionally, the memory 930 may include a read-only memory and a random access memory, and provides an instruction and data for the processor. A part of the memory may further include a non-volatile random access memory. For example, the memory may further store information about a device type. The processor 910 may be configured to execute instructions stored in the memory, and when the processor 910 executes the instructions stored in the memory, the processor 910 is configured to perform the steps and/or procedures of the foregoing method embodiments corresponding to the network repository network element or the mobility management network element.

It should be understood that the transceiver may include a transmitter and a receiver. The transceiver may further include an antenna, and a quantity of antennas may be one or more. The memory may be a separate device or integrated into a processor. The devices or parts of the devices may be integrated into a chip for implementation, for example, integrated into a baseband chip for implementation.

In this embodiment of this application, the transceiver in FIG. 9 may also be a communications interface, which is not limited herein.

In the embodiments of this application, for ease of understanding, various examples are used for description. However, these examples are merely examples, which do not mean that they are the optimal implementations to implement this application.

In the embodiments of this application, for ease of description, a request message, a response message, and various other message names are used. However, these messages are merely used as examples to describe contents that need to be carried or functions that need to be implemented, and specific names of the messages do not limit this application, for example, may alternatively be a first message, a second message, a third message, and the like. These messages may be specific messages, or may be fields in the messages. These messages may further represent various service operations.

It should also be understood that in this embodiment of this application, the processor in the apparatus may be a central processing unit (CPU), or the processor may be another general purpose processor, a digital signal processor (DSP), an application-specific integrated circuit (ASIC), a field programmable gate array (FPGA), or another programmable logic device, a discrete gate or transistor logic device, a discrete hardware component, or the like. The general purpose processor may be a microprocessor, or the processor may be any conventional processor, or the like.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software unit. A software unit may be located at a mature storage medium in the art, such as a random access memory, a flash memory, a read-only memory, a programmable read-only memory, an electrically erasable programmable memory, a register, or the like. The storage medium is located at the memory, and the processor executes instructions in the memory and completes the steps in the foregoing methods in combination with hardware of the processor. To avoid repetition, details are not described herein again.

All or some of the foregoing embodiments may be implemented by means of software, hardware, firmware, or any combination thereof. When being implemented by using software, all or some of the embodiments may be implemented in a form of a computer program product. The computer program product includes one or more computer instructions. When the computer program instructions are loaded and executed on a computer, all or some of the processes or functions according to the embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may be aware that units and algorithm steps in the examples described with reference to the embodiments disclosed in this specification can be implemented by electrical hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
sending, by a mobility management network element, a first request message to a network repository network element, wherein the first request message comprises a data network name of a session that a terminal device requests to establish;
receiving, by the network repository network element, the first request message from the mobility management network element;
determining, by the network repository network element based on the first request message, at least one target session management network element from session management network elements that support the data network name;
sending, by the network repository network element, an identifier of the at least one target session management network element and information about a service area of the at least one target session management network element to the mobility management network element;
receiving, by the mobility management network element, the identifier of the at least one target session management network element and the information about the service area of the at least one target session management network element;
determining, by the mobility management network element based on first location information and the information about the service area of the at least one target session management network element, whether the at least one target session management network element supports a first location, wherein the first location information indicates the first location corresponding to an access network accessed by the terminal device;
sending, by the mobility management network element, a second request message to the network repository network element if the at least one target session management network element cannot support the first location, wherein the second request message carries the first location information;
receiving, by the network repository network element, the second request message;
sending, by the network repository network element, a second identifier of at least one fourth session management network element to the mobility management network element, wherein a type of the at least one fourth session management network element is an intermediate session management network element, and wherein the intermediate session management network element is configured to control a user-plane function network element that interfaces with the access network; and
receiving, by the mobility management network element, the second identifier of the at least one fourth session management network element from the network repository network element.

2. The communication method according to claim 1, wherein the information about the service area of the at least one target session management network element is a range in which the at least one target session management network element can provide a service.

3. The communication method according to claim 2, wherein the range comprises one or more tracking area identities.

4. The communication method according to claim 1, further determining, by the network repository network element based on the first location information, the at least one fourth session management network element that supports the first location.

5. The communication method according to claim 1, further comprising receiving, by the network repository network element, a registration request message, wherein the registration request message comprises information about a second service area of at least one session management network element, wherein the information about the second service area indicates a range supported by the at least one session management network element, and wherein the at least one session management network element comprises the at least one target session management network element.

6. The communication method according to claim 1, further comprising:
detecting when the terminal device moves and a connection of the terminal device is switched from a source access network to a target access network;
sending, by the mobility management network element, second location information of the terminal device to the network repository network element, wherein the second location information indicates a second location corresponding to the target access network accessed by the terminal device;
receiving, by the network repository network element, the second location information;
determining, by the network repository network element based on the second location information, at least one fifth session management network element that supports the second location, wherein the at least one fifth session management network element controls a user-plane function network element that interfaces with the target access network;
sending, by the network repository network element, a third identifier of the at least one fifth session management network element to the mobility management network element; and
receiving, by the mobility management network element, the third identifier of the at least one fifth session management network element.

7. The communication method according to claim 1, further comprising:
detecting when the terminal device moves and a connection of the terminal device is switched from a source access network to a target access network;
determining, by the mobility management network element based on a second location and information about a second service area of a source session management network element, whether to reselect a target intermediate session management network element for the terminal device, wherein the source session management network element is configured to control a user-plane function network element that interfaces with the source access network, wherein the target intermediate session management network element is configured to control a second user-plane function network element that interfaces with the target access network, and wherein the second location corresponds to the target access network accessed by the terminal device;

sending, by the mobility management network element, second location information to the network repository network element when the mobility management network element determines that the target intermediate session management network element needs to be reselected for the terminal device, wherein the second location information indicates the second location;

receiving, by the network repository network element, the second location information;

sending, by the network repository network element, a third identifier of at least one fifth session management network element to the mobility management network element, wherein the third identifier is determined based on the second location information; and receiving, by the mobility management network element, the third identifier.

8. The communication method according to claim 7, wherein determining to reselect the target intermediate session management network element for the terminal device comprises:

determining, by the mobility management network element, whether the source session management network element supports the second location; and determining, by the mobility management network element, to reselect the target intermediate session management network element for the terminal device when the source session management network element cannot support the second location.

9. The communication method according to claim 1, before sending the first request message to the network repository network element, the communication method further comprises receiving, by the mobility management network element, a protocol data unit (PDU) session establishment request.

10. The communication method according to claim 1, wherein after receiving the identifier of the at least one fourth session management network element from the network repository network element, the communication method further comprises sending, by the mobility management network element, a session establishment request to a session management network element in the at least one fourth session management network element.

11. A communication system, comprising:

a mobility management network element configured to send a first request message, wherein the first request message carries a data network name of a session that a terminal device requests to establish; and a network repository network element configured to:
  receive the first request message from the mobility management network element;
  determine, based on the first request message, at least one target session management network element from session management network elements that support the data network name; and
  send an identifier of the at least one target session management network element and information about a service area of the at least one target session management network element to the mobility management network element, wherein the mobility management network element is further configured to
  receive the identifier of the at least one target session management network element and the information about the service area of the at least one target session management network element;

determine, based on the first location information and the information about the service area of the at least one target session management network element, whether the at least one target session management network element supports a first location, wherein the first location information indicates the first location corresponding to an access network accessed by the terminal device; and send a second request message to the network repository network element if the at least one target session management network element cannot support the first location, wherein the second request message carries the first location information, wherein the network repository network element is further configured to,
  receive the second request message; and
  send a second identifier of at least one fourth session management network element to the mobility management network element, wherein a type of the at least one fourth session management network element is an intermediate session management network element, and wherein the intermediate session management network element is configured to control a user-plane function network element that interfaces with the access network.

12. The communication system according to claim 11, wherein the service area of the at least one target session management network element is a range in which the at least one target session management network element can provide a service.

13. The communication system according to claim 11, wherein the network repository network element is further configured to determine, based on the first location information, the at least one fourth session management network element that supports the first location, and wherein the mobility management network element is further configured to receive the second identifier of the at least one fourth session management network element.

14. The communication system according to claim 11, wherein the network repository network element is further configured to receive a registration request message, wherein the registration request message comprises information about a second service area of at least one session management network element, wherein the information about the second service area indicates a range supported by the at least one session management network element, and wherein the at least one session management network element comprises the at least one target session management network element.

15. The communication system according to claim 11, wherein the mobility management network element is further configured to send second location information of the terminal device to the network repository network element, wherein the second location information indicates a second location corresponding to a target access network accessed by the terminal device, wherein the network repository network element is further configured to:
  receive the second location information;
  determine, based on the second location information, at least one fifth session management network element that supports the second location, wherein the at least one fifth session management network element controls a user-plane function network element that interfaces with the target access network; and send a third identifier of the at least one fifth session management network element to the mobility management network element, and wherein the mobility management network element is further configured to receive the third identifier of the at least one fifth session management network element.

16. The communication system according to claim 11, wherein the mobility management network element is further configured to receive the second identifier of the at least one fourth session management network element from the network repository network element.

17. The communication system according to claim 11, wherein the mobility management network element is further configured to:
   determine, based on a second location and information about a second service area of a source session management network element, whether to reselect a target intermediate session management network element for the terminal device, wherein the source session management network element is configured to control a user-plane function network element that interfaces with a source access network, wherein the target intermediate session management network element is configured to control a second user-plane function network element that interfaces with a target access network, and wherein the second location is a location corresponding to the target access network accessed by the terminal device; and
   send second location information to the network repository network element when determining that the target intermediate session management network element needs to be reselected for the terminal device, wherein the second location information indicates the second location corresponding to the target access network accessed by the terminal device,
   wherein the network repository network element is further configured to receive the second location information, and send a third identifier of at least one fifth session management network element to the mobility management network element, wherein the third identifier of the at least one fifth session management network element is determined based on the second location information, and
   wherein the mobility management network element is further configured to receive the third identifier of the at least one fifth session management network element.

18. The communication system according to claim 17, wherein the mobility management network element is configured to:
   determine whether the source session management network element supports the second location; and
   determine to reselect the target intermediate session management network element for the terminal device when the source session management network element cannot support the second location.

19. A mobility management network element, comprising:
   at least one processor; and
   a memory coupled to the at least one processor and storing computer-executable instructions that, when executed by the at least one processor, cause the mobility management network element to:
      send a first request message to a network repository network element, wherein the first request message comprises a data network name of a session that a terminal device requests to establish;
      receive, from the network repository network element, an identifier of at least one target session management network element and information about a service area of the at least one target session management network element, wherein the at least one target session management network element supports the data network name;
      determine, based on first location information and the information about the service area of the at least one target session management network element, whether the at least one target session management network element supports a first location, wherein the first location information indicates the first location corresponding to an access network accessed by the terminal device;
      send a second request message to the network repository network element if the at least one target session management network element cannot support the first location, wherein the second request message comprises the first location information; and
      receive an identifier of at least one fourth session management network element from the network repository network element, wherein a type of the at least one fourth session management network element is an intermediate session management network element, and wherein the intermediate session management network element is configured to control a user-plane function network element that interfaces with the access network.

20. The mobility management network element according to claim 19, wherein the computer-executable instructions, when executed by the at least one processor, further cause the mobility management network element to receive a protocol data unit (PDU) session establishment request.

21. The mobility management network element according to claim 19, wherein the computer-executable instructions, when executed by the at least one processor, further cause the mobility management network element to send a session establishment request to a session management network element in the at least one fourth session management network element.

22. A communication method, comprising:
   sending, by a mobility management net ork element, a first request message to a network repository network element, wherein the first request message comprises a data network name of a session that a terminal device requests to establish;
   receiving, by the mobility management network element, from the network repository network element, an identifier of at least one target session management network element and information about a service area of the at least one target session management network element, wherein the at least one target session management network element supports the data network name;
   determining, by the mobility management network element, based on first location information and the information about the service area of the at least one target session management network element, whether the at least one target session management network element supports a first location, wherein the first location information indicates the first location corresponding to an access network accessed by the terminal device;
   sending, by the mobility management network element, a second request message to the network repository network element if the at least one target session management network element cannot support the first location, wherein the second request message comprises the first location information; and receiving, by the mobility management network element, an identifier of at least one fourth session management network element from the network repository network element, wherein a type of the at least one fourth session management network element is an intermediate session management network element, and wherein the intermediate session management network element is configured to control a user-plane function network element that interfaces with the access network.

23. The communication method according to claim 22, further comprising receiving, by the mobility management network element, a protocol data unit (PDU) session establishment request.

24. The communication according to claim 22, further comprising sending, by the mobility management network element, a session establishment request to a session management network element in the at least one fourth session management network element.

25. The communication method according to claim 22, wherein the information about the service area of the at least one target session management network element is a range in which the at least one target session management network element can provide a service.

26. The communication method according to claim 25, wherein the range comprises one or more tracking area identities.

* * * * *

UNITED STATES PATENT AND TRADEMARK OFFICE
CERTIFICATE OF CORRECTION

PATENT NO. : 11,528,761 B2
APPLICATION NO. : 16/928636
DATED : December 13, 2022
INVENTOR(S) : Zaifeng Zong, Wenfu Wu and Fenqin Zhu It is certified that error appears in the above-identified patent and that said Letters Patent is hereby corrected as shown below:

In the Claims

Claim 4, Column 42, Line 8: "further determining, by" should read "further comprising determining, by"

Claim 22, Column 46, Line 45: "management net ork element" should read "management network element"

Signed and Sealed this
Twenty-fourth Day of January, 2023

Katherine Kelly Vidal
*Director of the United States Patent and Trademark Office*